United States Patent [19]

Cloonan et al.

[11] Patent Number: 4,830,444
[45] Date of Patent: May 16, 1989

[54] OPTICAL SWITCH

[75] Inventors: Thomas J. Cloonan, Willowbrook; Harvard S. Hinton, Naperville; Frederick B. McCormick, Jr., Lisle, all of Ill.

[73] Assignee: American Telephone and Telegraph Company, AT&T Bell Laboratories, Murray Hill, N.J.

[21] Appl. No.: 140,200

[22] Filed: Dec. 31, 1987

[51] Int. Cl.[4] ............ G02B 5/32; G02B 6/42
[52] U.S. Cl. ................. 350/3.73; 350/96.15
[58] Field of Search ........... 364/827; 350/3.72, 3.73, 350/96.15

[56] References Cited

U.S. PATENT DOCUMENTS

| | | | |
|---|---|---|---|
| 4,546,244 | 10/1985 | Miller | 250/211 J |
| 4,751,378 | 6/1988 | Hinton et al. | 250/211 J |
| 4,754,132 | 6/1988 | Hinton et al. | 250/211 J |
| 4,764,889 | 8/1988 | Hinton et al. | 364/807 |
| 4,764,890 | 8/1988 | Hinton | 364/837 |

OTHER PUBLICATIONS

J. W. Goodman et al., "Application of Optical Communication Technology to Optical Information Processing", *LASL Optics Conference*, vol. 190, pp. 485–496.
A. R. Dias, "Incoherent Optical Matrix–Matrix Multiplier", Radar and Optics Division, Environmental Research Institute of Michigan, pp. 71–83.
J. W. Goodman et al., "Fully Parallel, High–Speed Incoherent Optical Method for Performing Discrete Fourier Transforms", *Optics Letters*, Jan. 1978, vol. 2, No. 1, pp. 1–3.
U. Killat et al., "Binary Phase Gratings for Star Couplers with High Splitting Ratio", *Fiber and Integrated Optics*, vol. 4, No. 2, pp. 159–167.
F. J. Harris, "On the Use of Windows for Harmonic Analysis with the Discrete Fourier Transform", *Proceedings of the IEEE*, Jan. 1978, vol. 66, No. 1, pp. 51–83.
H. Nakano et al., "Optical System for Real–Time Processing of Multiple Matrix Product", *Electronics Letters*, May 9, 1985, vol. 21, No. 10, pp. 435–437.

Primary Examiner—Bruce Y. Arnold
Attorney, Agent, or Firm—Ross T. Watland

[57] ABSTRACT

An optical switch (100) is disclosed for switching spatially-separated complementary optical signals from a row of a two-dimensional input storage array (132) to a selected row of a two-dimensional ouptut storage array (133). The switch includes an input system (101) for converting temporally-separated information represented by a serial bit stream of complementary optical signals into a spatially-separated format for storage in the input array. An output system 105 is also included for converting the switched, spatially-separated information in the output array into a temporally-separated format for serial transmission on plurality of optical output fiber pairs 160(1)–160(N). The input and output systems enable the switch to perform both time- and space-division switching with only a single stage of switching. A distributor system (103), also included in the switch, spatially distributes the optical signal pairs from a row of the input array over the entire output array for selective storage of the information represented by the signals in one or more rows of the output array.

30 Claims, 15 Drawing Sheets

TOP VIEW

OPTICAL SWITCH

CROSS-REFERENCE TO RELATED APPLICATION

This application is related to the application of Anthony L. Lentine entitled "Tri-State Optical Device" (S.W. 140, 198) which application is assigned to the assignee of the present application, and is being filed concurrently herewith.

FIELD OF INVENTION

This invention relates generally to optical switches and particularly to optical switches for switching optical signals in free space.

BACKGROUND OF THE INVENTION

Two-by-two optical directional couplers are used to switch guided-wave optical signals. A problem with these guided-wave directional couplers is the loss of power associated with coupling in and out of them. As a result, the size of a switching matrix containing these directional couplers is limited. One such directional coupler is the lithium niobate crossbar coupler which has an elongated physical structure. As a consequence, any sizable switching matrix containing this crossbar coupler would have to be physically folded which would introduce additional power losses.

Optical cross-bar switches for switching an unguided optical signal in free-space from any position in a single column to one selected position in a single row are also known. A two dimensional array of selectors/decoders is positioned typically between two lenses to implement this crossbar optical switch. However, these optical switches are limited to switching optical signals in only one dimension, i.e., a single column to a single row or vice versa.

A single stage of these prior art optical crossbar switches can perform time-division optical switching such as rearranging serial bits received on an optical fiber. A single stage of these optical switches can also perform space-division switching in which a serial bit stream is switched form one input fiber to a selected output fiber. Furthermore, several stages of these optical switches may be interconnected to perform space- and time-division switching. However, the problem is that these optical crossbar switches can not be combined to perform both space- and time-division optical switching with only a single optical switching stage. As previously suggested, these optical crossbar switches are also limited to switching optical signals in one dimension.

SUMMARY OF THE INVENTION

The foregoing problems and associated disadvantages are solved and a technical advance is achieved in an illustrative free-space optical switch having a two-dimensional input array, a distributor, and a two-dimensional output array for spatially switching optical information signals from a selected row of a input array to a selected row of the output array. Also included in the switch is an input system for converting a temporally-separated, serial bit stream of optical information signals into spatially-separated, parallel bits of information that are stored in the input array. As a result, a significant advance in the art is achieved in that this optical switch performs both space- and time-division switching of optical signals with a single stage of switching. Furthermore, this optical switch advantageously switches optical signals in two dimensions such as from a row of an array of optical sources. The distributor of this novel optical switch spatially distributes an electric field pattern resulting, for example, from an optical signal from any position of a plurality of input positions, into an output electric field pattern for illuminating all of a plurality of output positions such that the magnitude of the output electric field pattern is a Fourier transform of the input electric field pattern. The distributor advantageously centers and spreads an optical signal from, for example, an individual column of a selected row of an array of input positions about its optical axis and the center of an individual corresponding column of the output array to illuminate every position in the individual corresponding output column. The same results are achieved regardless of the vertical position of the optical signal in the input column. Similar results occur for each optical signal emitted from any other column in the selected input array row.

Further included in the optical switch is an encoder located at the input positions for emitting selectively an optical input signal from a selected input position. The encoder controls the sequence or order in which selected optical signals are passed through the distributor. In the illustrative embodiment where the input positions are aligned in rows and columns, the encoder selectively emits one row of spatially-separated optical signals at a time to the distributor.

The input system of the switch includes an array having rows of optical input shift registers for converting a temporally-separated, serial bit stream of optical information signals from, for example, each of a plurality of optical input fibers into spatially-separated information bit patterns and an input storage array having rows for storing the spatially-separated information bit patterns from each shift register row. Illustratively, the serial temporally-separated information from an optical fiber is applied simultaneously to one end of a group of shift register rows. During each time slot or period of time, only one shift register row in the group is enabled to receive the temporally-separated information signals and shift the spatially-separated information across the entire length of the row. During each successive time slot, another individual shift register row is enabled to receive and shift the information of that time slot. After all the shift register rows in the group have been loaded, the spatially-separated information bit patterns in all the rows are transferred together in parallel to the input storage array.

In addition to converting temporally-separated information to spatially-separated information, another advantage of this input system is that the loaded input storage array applies the entire array of spatially-separated information of, for example, a time frame to the encoder array for selective application to the distributor while the shift register array is being loaded with a successive time frame of temporally-separated information from the optical input fibers.

A significant result of this temporal to spatial conversion is that only the shift register array has to operate at the data rate of the temporally-separated information. The input storage array, encoder, and distributor advantageously operate at a speed slower than the data rate of the temporal information.

To improve the signal-to-noise ratio of the distributed optical signal at the output positions, the encoder array has periodically aligned optical devices positioned, for example, in rows and columns of the input array for emitting an optical signal from a selected device or row of devices. The signal-to-noise ratio of a distributed optical output signal in a column of the output array is significantly improved over prior-art switches by decreasing the distance between the encoder devices in a column of the input array as well as controlling the shape of the emitting area of the encoder devices. This is a particular advantage of this optical switch since the contrast ratio of, for example, bistable encoder device elements may be as low as 1.5 to 2.0. Without an infinite contrast ratio between the bistable conducting and nonconducting states of an optical element, an optical noise signal from each element in an input column is spatially distributed with the selected optical information signal onto the output array. The encoder advantageously controls the contribution of each optical noise signal to the input electric field pattern so that the Fourier transform thereof results in a predetermined output electric field pattern distributed about the entire height of each output array column. When the magnitude of contribution of each input optical noise signal is substantially equivalent, the signal-to-noise ratio is significantly improved at predetermined locations in the output column where the decoder elements are advantageously positioned.

To further improve the signal-to-noise ratio at predetermined locations in an output column, the optical switch further comprises means for applying to the encoder array an optical power signal having a predetermined magnitude such as a Gaussian distribution across the entire height of the colums of the encoder array and a uniform distribution across the entire length of the encoder array rows. The Fourier transform of the resulting optical noise signals and an optical information signal exhibits a further improvement in the signal-to-noise ratio at selected locations along the height of the output column.

To complete the switching function, a decoder array having a plurality of optical storage elements at the output positions of the switch selectively stores the spatially-distributed optical signals passed through the distributor. Thus, an optical signal from any input array position can be switched to any one or more output array positions. In the illustrative switch, the decoder storage devices are also aligned in columns and rows with the same number of columns as the encoder array to take advantage of signal-to-noise improvements associated with the Fourier transform of periodically aligned optical sources. The information stored in one or more of the selected output array rows is then passed to the optical output system for subsequent spatial to temporal conversion and distribution to a plurality of output fibers. Arranging the decoder storage devices in rows and columns advantageously provides a broadcast capability when one or more rows of the array are associated with an individual communications channel.

In the illustrative optical switch, the distributor includes means having an optical axis for centering about the axis the optical signal propagating from any position of the input positions. By way of example, this includes a cylindrical converging lens for producing a Fourier transform at the focal plane of the lens.

To illuminate all of the output positions with the input and output arrays closer together, the distributor also includes magnification means such as a cylindrical diverging lens for magnifying the optical signals passing therethrough in, for example, the vertical direction.

The distributor of this optical switch further includes imaging means such as a cylindrical converging lens for limiting the spreading of the optical signal, for example, in the horizontal direction. This advantageously prevents the introduction of interference in neighboring columns and reduces optical power loss.

Another advantage of this optical switch is the inclusion of an optical output system for storing and converting the spatially-separated information to temporally-separated, serial bit streams of optical information signals that are transmitted on a plurality of output fibers. Similar to the optical input system, the output system comprises an output storage array having rows for storing selected rows of information received from the decoder array and a plurality of output shift register rows for shifting the information stored in an output storage array row onto an optical output fiber as a temporally-separated, serial bit stream of optical information signals.

BRIEF DESCRIPTION OF THE DRAWING

The invention is more fully understood from the following Detailed Description when read with reference to the following drawing in which.

DETAILED DESCRIPTION

Figure 1:
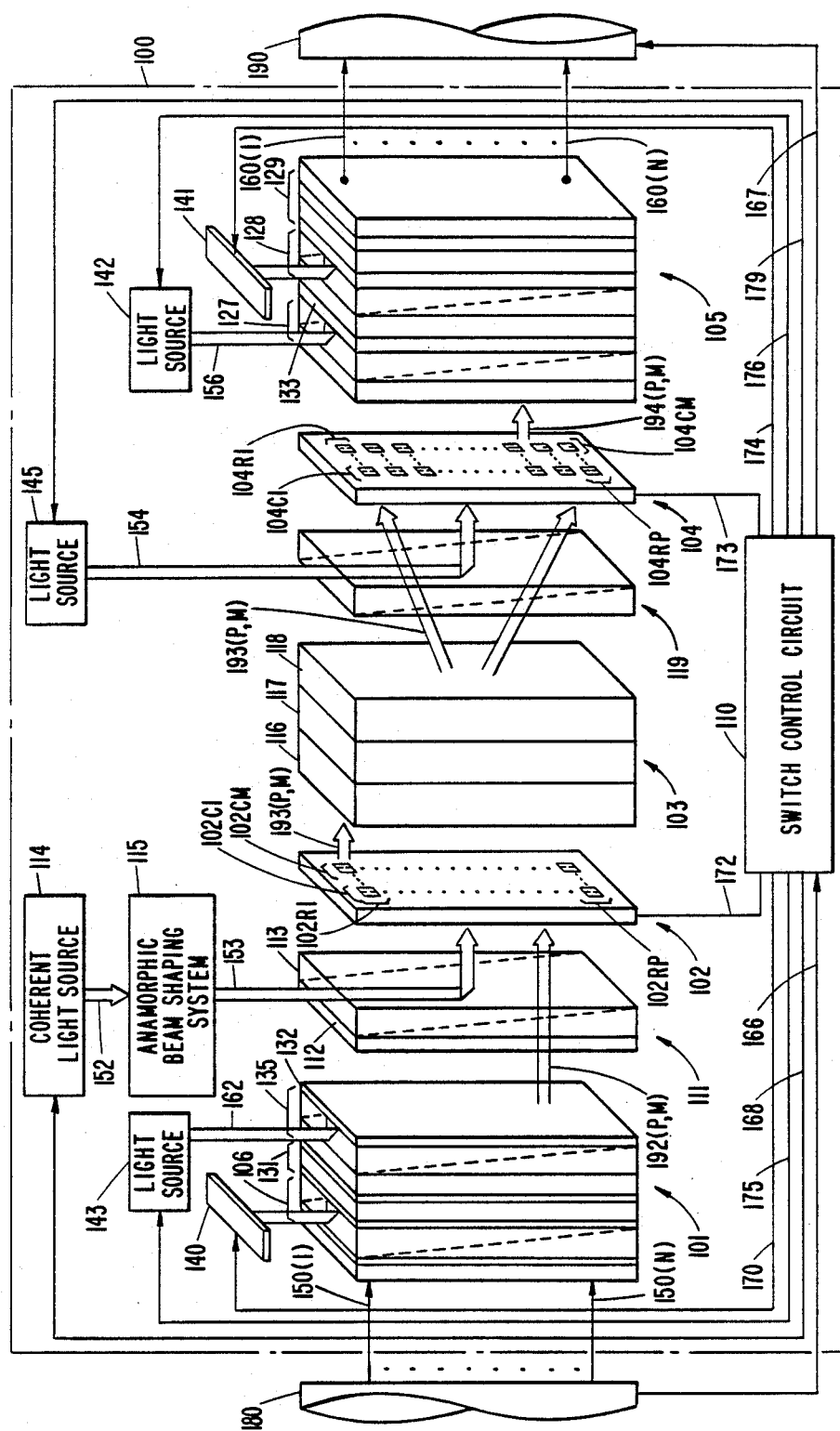
FIG. 1 depicts an illustrative optical switch of this invention.

Depicted in FIG. 1 is an illustrative optical switch 100 for performing both time- and space-division switching in the free-space and unguided optical domain with a single stage of switching. Basically, the switch comprises input system 101, encoder array 102, distributor 103, decoder array 104, and output system 105 under the control of switch control circuit 110. Input system 101 includes an input shift register unit 131 having rows of shift registers and an array of storage elements 132 that face the shift register rows and are correspondingly positioned with respect to the shift register rows. The input system converts temporally-separated information represented by a pair of serial bit streams of complementary optical information signals that are received from each pair of optical input fiber pairs 150(1)–150(N) into a spatially-separated format and stores the spatially-separated information in the rows of shift registers during a given period of time. This period of time is commonly referred to as a time frame that includes a plurality of time slots. Each time slot of information or data typically includes a sample of data from a communication channel. Each bit pair of complementary optical information signals represent a single bit of binary information. The information is stored in the shift register unit such that each time-slot of data is stored in a single shift register row. At the end of each time frame, all the spatially-separated information in the shift register rows is transferred and stored in the corresponding rows of the input storage array for encoder selection during the next successive time frame while the shift register unit is loaded with another time frame of information.

Under control of switch control circuit 110, the encoder array 102 selects optical signals representing the information stored in the input storage array on a row-by-row basis so that only one row of spatially-separated optical information signals propagates through the distributor at any given time. Distributor 103 spatially distributes each pair of optical signals, which are emitted from a column of the selected encoder row, across the entire height of the individual corresponding column of decoder array 104. As a result, each row of the decoder array has access to the information stored in any row of the input storage array selected by the encoder array. The decoder array has the same number of columns as the input encoder array which are both under the control of switch control circuit 110. The decoder array selects one or more of its rows for transferring information to the output system for storage therein. When the decoder array has at least the same number of rows as the encoder array, the switch is operable as a totally nonblocking switch.

Similar to input system 101, output system 105 includes an array of storage elements 133 and output shift register unit 129 havong rows of shift registers. During a given time frame, the information in each row of the input storage array selected by the encoder array is spatially switched to a row of the output storage array selected by the decoder array. Thus, the information in any row of the input storage array can be selectively transferred to any one or more of the rows in the output storage array. At the end of the time frame, all the spatially-separated information in the output storage array is transferred to and stored in the output shift register unit for conversion to a temporally-separated format. The information in a temporally-separated format is once again represented by a pair of serial bit streams of complementary optical information signals that are shifted onto one pair of a plurality of optical output fiber pairs 160(1)–160(N). As a result, optical switch 100 performs space-division switching by switching the information from any input fiber pair to any output fiber pair and, additionally, performs time-division switching by switching the temporally-separated, serial information such as a time slot of data on any input fiber pair into any other time slot of the time frame. Furthermore, the optical switch concurrently performs both time-and space-division switching by switching the information in any of the time slots of a given time frame from one input fiber pair to any of the time slots in the same time frame on any one or more of the output fiber pairs.

Figure 2:
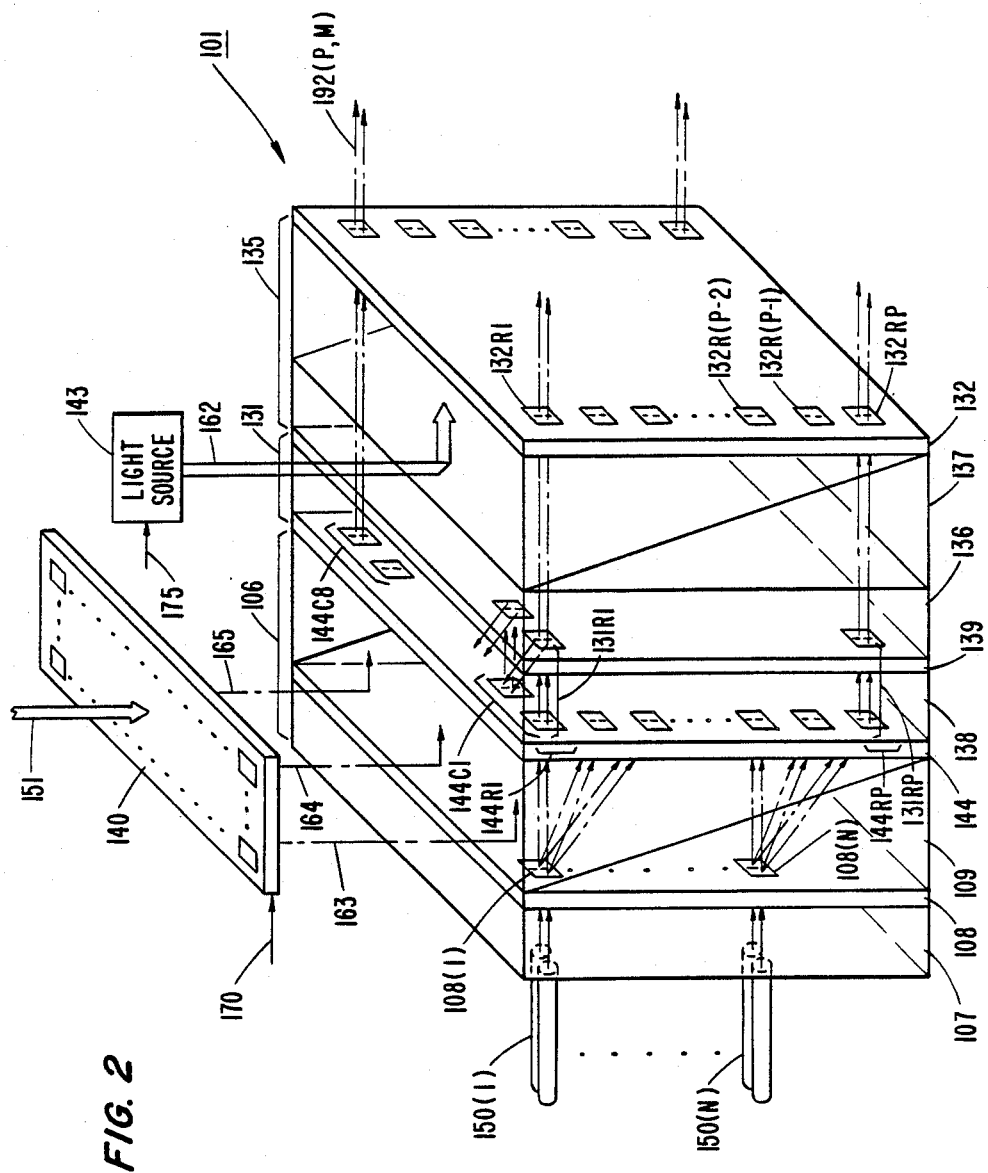
FIG. 2 depicts a detailed drawing of the input system of the optical switch of FIG. 1.

Depicted in FIG. 2 is a detailed diagram of input system 101. The input system comprises optical input interface unit 106, optical input shift register unit 131 having shift register rows 131R1–131RP, intermediate interface unit 135, and input storage element array 132. Input shift register unit 131 receives temporally-separated information represented by the serial bit pairs of complementary optical information signals that are received from each pair of the optical input fiber pairs 150(1)–150(N) via optical input interface unit 106.

Figure 12:
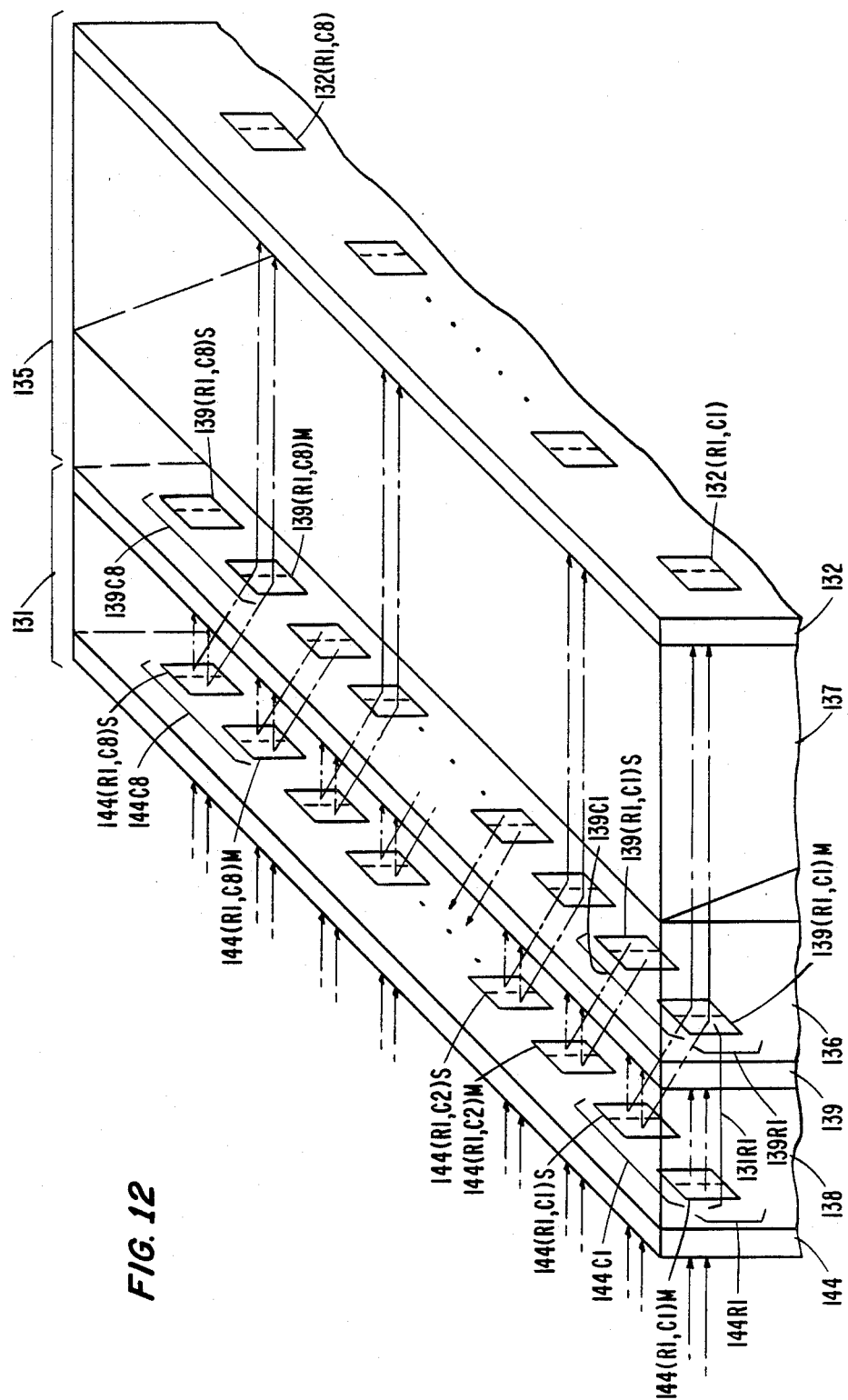
FIG. 12 depicts a detailed drawing of a portion of the input system of FIG. 2.

As depicted in FIG. 2 and in more detail in FIG. 12, input shift register unit 131 comprises an array of optical storage elements 144 that are aligned in rows 144R1–144RP and columns 144C1–144C8, a corresponding array of holograms 139, and an imaging system 138 positioned therebetween to form input shift register rows 131R1–131RP. Analogous to an electronic shift register with a master and a slave storage device for each bit position, each optical shift register row 131R1–131RP includes a master and a slave optical storage element for each bit position. Assuming that each shift register row stores and shifts eight-bits of information, each shift register row includes 16 optical storage elements that are optically interconnected by 16 correspondingly positioned holograms in a row of hologram array 139.

As depicted in FIG. 12, shift register row 144R1 comprises master and slave optical storage element pairs 144(R1,C1)M,S–144(R1,C8)M,S. Hologram array row 139R1 comprises a like plurality of reflection hologram pairs 139(R1,C1)M,S–139(R1,C8)M,S having diffraction efficiencies less than 100 percent that are positioned facing optical storage elements 144(R1,C1)M,S–144(R1,C8)M,S respectively. Input storage array row 132R1 comprises optical storage elements 132(R1,C1)–132(R1,C8) that are positioned facing master hologram elements 139(R1,C1)M–139(R,C8)M, respectively.

As depicted in FIG. 2, each optical input fiber pair is uniquely associated with a plurality of input shift register rows. For example, input fiber pair 150(1) is associated with input shift register rows 131R1–131RP. This configuration permits individual time slots of data, each of which is represented by a time slot of serially transmitted, complementary optical information bit signal pairs received on a given input fiber pair, to be stored in an individual shift register row of the plurality associated with that input fiber pair. The number of rows associated with an individual input fiber pair depends on the data rate of the received optical signals and how often each row of input storage array 132 must be distributed through the remainder of the switch.

Figure 13:
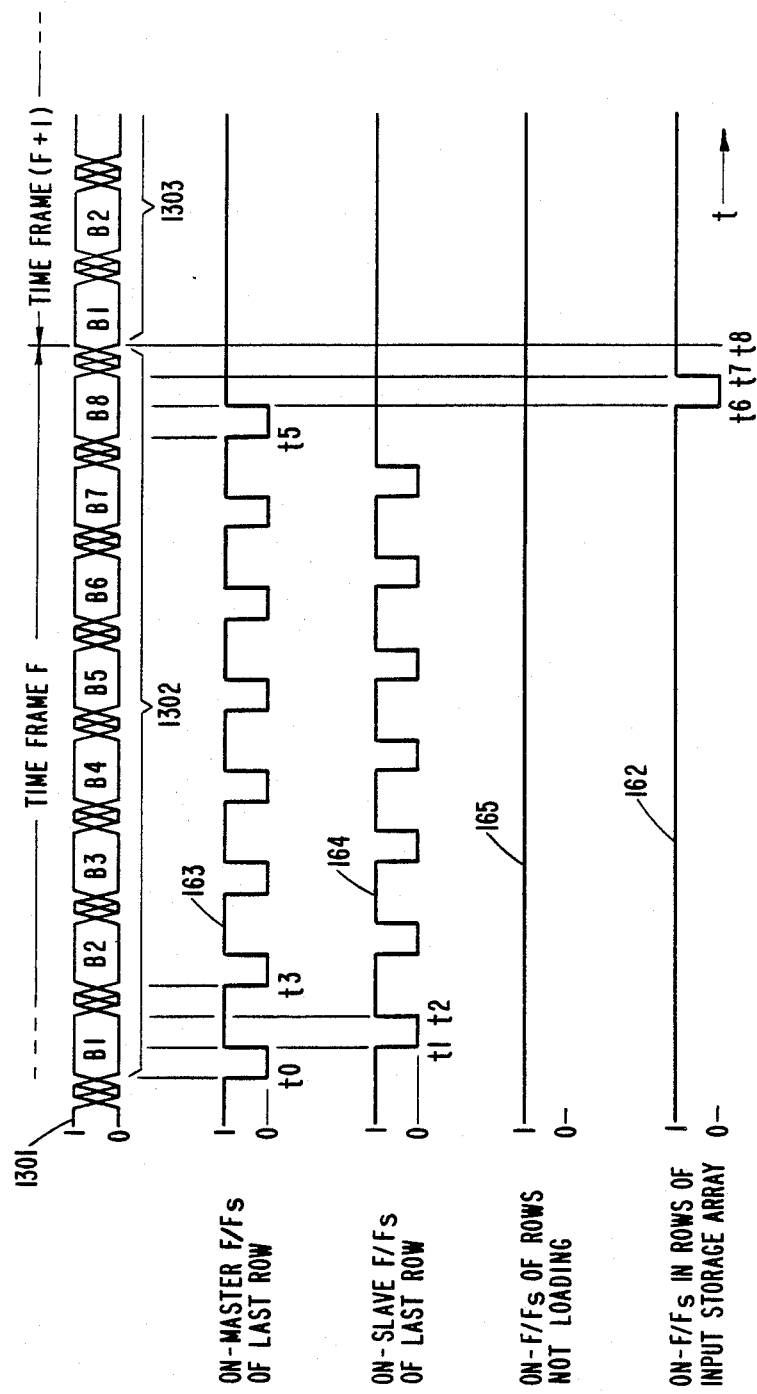
FIGS. 13–15 are timing diagrams of various illustrative optical information signals and optical and electrical timing control signals applied to input system 101, distributor 103, and output system 105 of the optical switch of FIG. 1.

Optical input interface unit 106 comprises optically transparent spacer material 107, a plurality of transmission holograms 108 for directing the optical information signal pairs received from the input fiber pairs to the storage elements, and beam splitter 109 for applying optical power signals such as clocked optical timing control signals 163-165 to each of the storage elements of input shift register unit 131. Well-known spatial light modulator 140, such as the Semetex Sight-Mod modulator, under the control of switch control circuit 110, emits clocked optical timing control signals 163-165 in response to optical bias beam 151 from an optical source (not shown). Receiving control signals from switched control circuit 110 via bus 170, the modulator emits timing signals 163-165 as depicted in FIG. 13 to load, shift, and transfer information from a given optical fiber to a selected input shift register row.

Hologram fringe pattern pairs 108(1)-108(N) of transmission hologram 108 split and redirect the serial optical information signal pairs from each of the respective input fiber pairs 150(1)-150(N) to each of the rows uniquely associated with that input fiber. Since each of the rows associated with a particular input fiber receives an optical information signal pair at the same time, only one of the input shift register rows associated with the fiber is enabled during a given time slot to receive and store the information represented by the optical information signal pair. The hologram pairs are formed in a well-known manner to split and redirect the optical information signal pairs from a given input fiber pair to an optical storage element in column 144C1 at the end of each storage element row. Each of the input fibers is affixed in a well-known manner to spacer material 107. The thickness of spacer material 107 is selected to allow the optical information signals from an input fiber pair to diverge sufficiently to illuminate entirely the fringe pattern pair of the hologram associated with the input fiber pair. As depicted in FIG. 1, optical input carrier facility 180 of which input fiber pairs 150(1)-150(N) are included provides well-known timing and synchronization signals to switch control circuit 110 via bus 166.

Beam splitter 109 is of a well-known polarization type that allows the optical information signals to pass therethrough from input fiber pairs 150(1)-150(N) with little power loss to the shift register storage elements in column 144C1. The beam splitter also redirects optical signals such as clocked optical timing signals 163-165 to each of the storage elements in input register unit 131. Depending on the type of optical device used for the storage element in 144, optical timing control signals 163-165 are either coherent or incoherent light having a uniform electric field distribution being applied to each of the elements in array 131.

Each of the optical storage elements in shift register unit 131 is for storing a bit of binary information represented by complementary optical information signal pairs received on one of input fiber pairs 150(1)-150(N). An optical device suitable for use as an optical storage element with a single input and a single output optical signal is the self electro-optic effect device described in U.S. Pat. No. 4,546,244. These devices may be optically interconnected to form a shift register for loading serially-received bits of optical information into a row of the storage array. The self electro-optic effect devices (SEED) may be interconnected and optically controlled as described in the applications of H. S. Hinton, Ser. No. 683,713, entitled "Optical Logic Arrangement", now U.S. Pat. No. 4,764,890 and of H. S. Hinton and D. A. B. Miller, Ser. No. 683,711, entitled "Optical Logic Arrangement with Self Electro-Optic Devices", now U.S. Pat. No. 4,764,889 filed concurrently on Dec. 19, 1984. These applications describe how the self electro-optic device may be optically interconnected to form an optical shift register for use in input shift register unit 131.

A preferable device suitable for use in input shift register unit 131 is described in the applications of H. S. Hinton, A. L. Lentine, and D. A. B. Miller, Ser. Nos. 042,411 and 042,202, entitled respectively "Symmetric Optical Device" and "Optical Device", filed concurrently on Apr. 24, 1987, and now U.S. Pat. Nos. 4,754,132 and 4,751,378, respectively. These references describe a self electro-optic effect device in which information represented by two complementary and symmetric optical signals are stored in these devices when the ratio of two optical signals incident thereon exceeds a predetermined threshold. Information stored therein is read therefrom by applying optical power signals simultaneously to the two quantum wells of the device. Two complementary and symmetric optical output signals are then emitted from the device representative of the information stored therein. Other known optical devices may also be used to store information represented by binary optical signals.

During a given time slot, each of input hologram pairs 108(1)-108(N) applies complementary pairs of serial optical information signals from each respective pair of input fibers to column 144C1 of the shift register unit, which are then shifted one bit at a time into a selected shift register row as each bit of binary information is received for the time slot. After which, another shift register row associated with the fiber pair is selected and loaded with the next time slot of data. A time slot of data is stored into each of the rows associated with each fiber pair until all the rows are loaded with spatially-separated time slots of information associated with a given time frame. The number of associated rows for each input fiber pair is dependent on the number of time slots of information per time frame.

Depicted in FIG. 13 is a timing diagram illustrating with respect to time, t, a pair of idealized complementary optical information signals 1301 on input fiber pair 150(N) and idealized optical timing control signals 162-165 that are all applied to optical input system 101. Only the last time slot of data 1302, also referred to as a word of data or information, of time frame F and a portion of the first word of data 1303 of time frame (F+1) are shown. Each word of data in optical information signal pair 1301 contains eight-bits B1-B8 of information.

In FIG. 13, all of the input timing control signals 162-165 are referenced and synchronized to an incoming reference clock signal on timing bus 166, which signal provides information regarding the boundaries of the incoming information bits. Responsive to this reference clock signal, switch control circuit 110 in a well-known manner controls the transitions of the optical timing control signals. For purposes of illustration, it will be assumed that there are three time slots or words of data in each time frame. The eight-bits B1-B8 of data word 1302 which sequentially arrives on input fiber 150(N) are shifted into and stored in the last row 131RP of input shift register unit 131.

To shift the last word 1302 of time frame F into the last input shift register row 131RP, electronically controlled spatial light modulator 140 emits optical timing control signals 163-165 with respect to time, t, as depicted in FIG. 13. Spatial light modulator 140 applies optical timing control signals 163 and 164 in an alternating manner to the third row of each plurality of rows associated with an input fiber pair. Optical timing signal 165 remains at a high level on all rows of input shift register unit 131 that have not been selected to be loaded during this time slot interval. Optical timing signals 163 and 164 alternately pulse at high (1) and low (0) power levels on the last shift register row 131RP. Optical timing signal 163 is directed at the master flip-flop storage elements in row 131RP, whereas optical timing signal 164 is directed at the slave flip-flop storage elements in row 131RP.

At time t0 when the leading edge of optical signal 1301 representing the first bit B1 stablizes on input fiber 150(N) and is spread by hologram 108(N) to each of the master flip-flop storage elements in column 144C1 of the last three rows of input shift register storage element array 144, timing control signal 163 incident on all master flip-flop storage elements in row 144RP transitions from a high power level (1) to a low power level (0), which enables the data to be stored in the first master flip-flop storage element 144(RP,C1)M of the last shift register row 131RP. Similarly, spatial light modulator 140 applies timing control signals 163 and 164 to the selected input shift register row associated with each of the other input fiber pairs.

At time t1 after data bit B1 has been stored in first master flip-flop storage element 144(RP,C1)M, timing control signal 163 incident on the master flip-flop storage elements transitions back to a high power level (1), and timing signal 164 incident on the slave flip-flop storage elements in the same row transitions from a high (1) to a low (0) power level. When the master flip-flop storage elements including the first master flip-flop storage element have a high power level optical signal incident thereon, the data stored in each propagates out as a pair of complementary optical information signals to hologram row 139RP, which redirects these signals back to the adjacent slave flip-flop elements in row 144RP. Since timing control signal 164 is at a low power level on the slave flip-flop elements in the last row 144RP, each of the information bits represented by a complementary optical information signal pair from a master flip-flop element is stored in the adjacent slave flip-flop elements. The portion of each optical information signal pair that is transmitted by the holograms in row 139RP does not affect input storage array 132, because timing control signal 162, which is incident on the entire input storage array is at a high power level (1) during the shifting of input data across an input shift register row. As a result, data bit B1 is shifted from the first master flip-flop storage element 144(RP,C1)M to the first slave flip-flop storage element 144(RP,C1)S.

At time t2, timing signal 164 incident on the slave elements returns to a high power level, and complementary information signal pair 1301 assumes complementary levels representing data bit B2 between times t2 and t3.

At time t3 when incoming bit B2 appears on input fiber pair 150(N) in a stable state, control signals 163–165 transition as previously described with the result that data bits B2 and B1 are stored in consecutive slave flip-flop elements 144(RP,C1) and 144(RP,C2), respectively. This sequence of optical control signals 163 and 164 is repeated until bits B1–B7 are stored in consecutive slave flip-flop elements of row 144RP.

At time t5 when the leading edge of information signal pair 1301 representing bit B8 stablizes on input fiber pair 150(N) and is directed by hologram 108(N) to storage element 144(RP,C1)M, timing control signal 163, once again, transitions to a lower power level on all master flip-flop elements in row 144RP, thus enabling bit B8 to be stored in master flip-flop element 144(RP,C1)M. At the same time, information bits B1–B7 via optical information signal pairs propagate from the slave flip-flop elements to the next consecutive master flip-flop element. At time t6, timing control signal 163 returns to a high power level with bits B1–B8 stored in the master flip-flop elements of storage row 144RP. Since this was the last word or time slot in time frame F, clocked light source 143, which is shown in FIGS. 1 and 2, causes timing control signal 162 at time t6 to assume a low power level on all the flip-flops in input storage element array 132, while timing control signals 163–165 are at a high power level. This enables all of the eight-bit data words to be transferred in parallel from the master flip-flop storage elements in array 144 through hologram array 139, each of which reflects part of the light and transmits the remaining part of the optical information signal pairs, to the elements in input storage array 132. The reflected light does not affect the data stored in flip-flop storage element array 144, because timing control signals 163–165 remain at a high power level during this parallel data transfer. This parallel transfer of data is completed at time t7 when optical signal 162 returns to a high power level. At time t8, time frame F ends, and time frame (F+1) begins. Prior to time t6, all of the P data words that have been previously stored in the input storage element array during the previous time frame (F−1) have been passed through encoder array 102 and distributor 103 and stored in decoder array 104.

Interface unit 135 comprises well-known optical imaging system 136 and beam splitter 137, which is of the well-known polarization type. Imaging system 136 individually focuses the optical information signal pair emitted from each hologram of hologram array 139 onto a corresponding storage element in input storage array 132. The optical information signals propagate through beam splitter 137 with minimal power loss. Furthermore, beam splitter 137 redirects clocked optical timing control signal 162 from clocked light source 143 to the elements in input storage array 132. Switch control switch 110 controls clocked light source 143 via control bus 175.

As depicted in FIG. 1, optical information signal pairs 192(P,M) propagate from input storage array 132 through optical encoder interface unit 111 to encoder array 102. Encoder interface 111 comprises optical imaging system 112 and beam splitter 113. Similar to imaging system 136, well-known imaging system 112 focuses the optical signal pair from each of the storage element pairs in input storage array 132 onto a corresponding element pair in encoder array 102 via beam splitter 113. Polarization-type beam splitter 113 also applies clocked optical bias beam 153 from clocked coherent light source 114 through anamorphic beam shaping system 115 to encoder array 102 in a well-known manner. Switch control circuit 110 controls clocked optical source 114 via control bus 168. A clocked coherent optical bias beam 152 is emitted from well-known optical source 114 and applied to anamorphic beam shaping system 115. The beam shaping system shapes the uniform magnitude of bias beam 152 into optical bias beam 153 which has a magnitude with a Gaussian distribution in one direction and uniform distribution in a direction normal thereto. Beam splitter 113 redirects the bias beam so that the Gaussian distribution is centered along the entire height of each column in encoder array 102. The uniform magnitude of bias beam 153 is spread across the rows of the encoder array.

Figure 3:
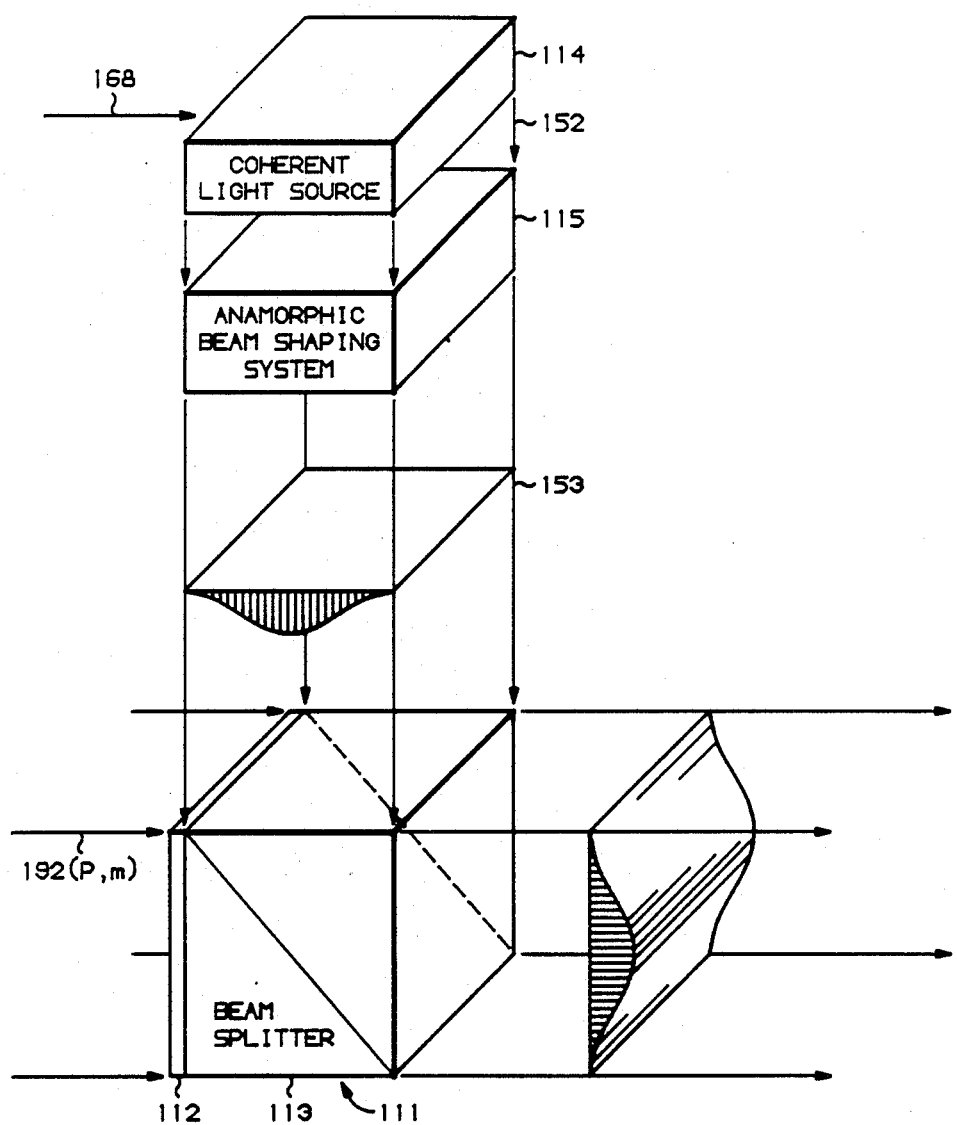
FIG. 3 shows a detailed illustration depicting the magnitude of an optical bias beam with a Gaussian distribution formed by a beam shaping system of the optical switch of FIG. 1.

Depicted in FIG. 3 is a detailed illustration depicting the magnitude of optical bias beam 153 with its Gaussian distribution in a first direction and its uniform magnitude in a direction normal to the first direction. The application of the optical bias beam having a Gaussian distribution applied to each column of encoder array 102 improves the signal-to-noise (SNR) ratio of the optical signals received by decoder array 104 and output system 105. Other distributions of bias beam magnitude may be applied to encoder array 102 to vary the signal-to-noise ratio of the light spatially distributed on decoder array 104.

Encoder array 102 is a spatial light modulator for modulating the information stored in input storage array 132 on a row-by-row basis. Switch control circuit 110 utilizes control bus 172 to sequence through the rows of the encoding array in a well-known manner enabling only one row thereof to store information from input storage array 132 during any given row cycle time period. Although all of the rows of the encoder array receive optical information signals 192(P,M) from input storage 132 during each row cycle time period, only one row of the encoder is enabled by switch control circuit 110 to store information and subsequently emit a coherent optical information signal pair for passage through distributor system 103.

Figure 4:
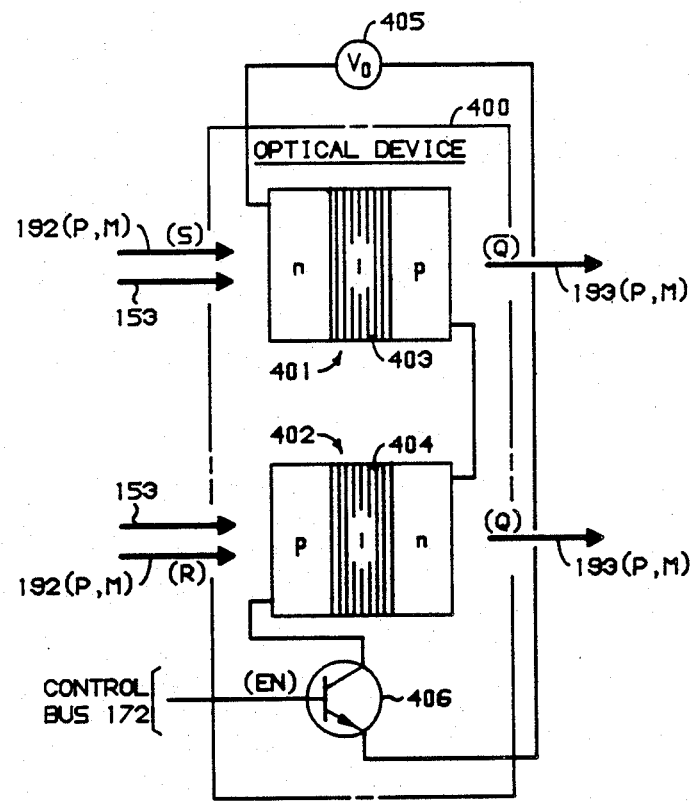
FIG. 4 depicts a circuit diagram of the self electro-optic effect device utilized in the encoder array of the optical switch of FIG. 1.
Figure 5:
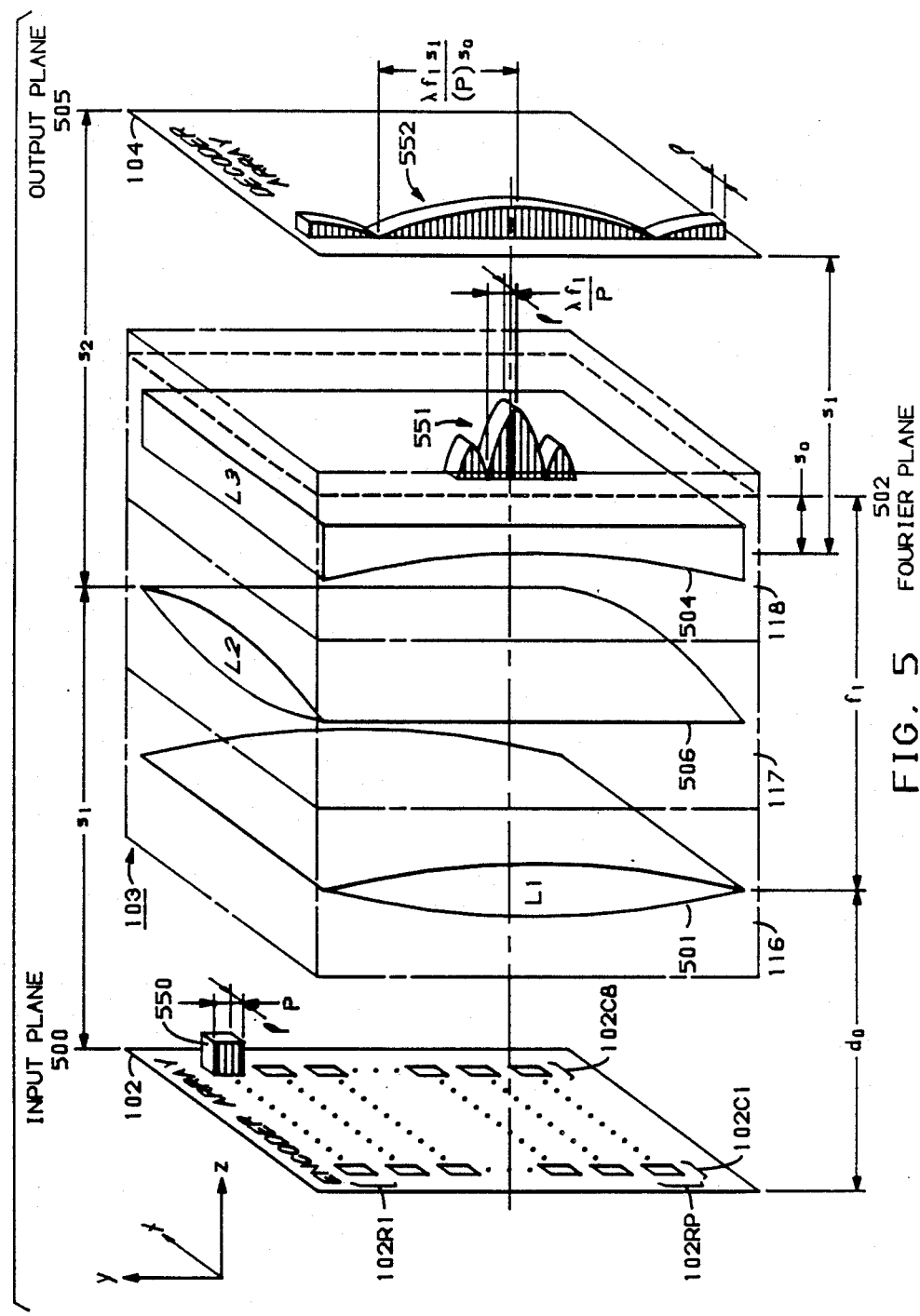
FIG. 5 depicts a detailed illustration of the distributor of the optical switch shown in FIG. 1.

As partially shown in FIG. 1 and more particularly in FIG. 5, the preferred embodiment of encoder array 102 comprises a plurality of three-state optical storage elements aligned in columns 102(C1)–102(C8) and rows 102(R1)–102(RP). An optical device suitable for use as a three-state optical storage element in the encoder array is depicted in FIG. 4 and is a modified version of the self electro-optic effect device described in the "Symmetric Optical Device" reference.

Depicted in FIG. 4 is a three-state symmetric self electro-optic effect device 400 having photodetectors 401 and 402 with respective semiconductor quantum-well regions 403 and 404 in the intrinsic (i) region. The device further includes conducting and nonconducting state switch 406 such as a transistor connected in series with photodetectors 401 and 402 and electrical-potential source 405. When enabled, this device emits from terminals $\overline{Q}$ and Q complementary optical information signal pair 193(P,M) having symmetric and complementary high and low power levels in response to optical bias beam 153 simultaneously incident on respective photodetectors 401 and 402. Complementary optical information signal pair 192(P,M) from the corresponding symmetric optical storage element pair in input storage array 132 set and reset the two states of the device as described in the reference when electronic switch 406, which is under the control of switch control circuit 110 via control bus 172, is enabled and in a conducting state. When switch 406 is in a disabled or nonconducting state, each photodetector emits a low power level optical output signal pair when bias beam 153 is incident thereon. A truth table of the logic states of device 400 operated as an optical S-R latch is depicted in Table A.

TABLE A

|  | In | | | Out | |
|---|---|---|---|---|---|
|  | S | R | En | Q | $\overline{Q}$ |
| Disabled | 0 | 1 | 0 | 0 | 0 |

TABLE A-continued

|  | In | | | Out | |
|---|---|---|---|---|---|
|  | S | R | En | Q | $\overline{Q}$ |
|  | 1 | 0 | 0 | 0 | 0 |
| Enabled | 0 | 1 | 1 | 0 | 1 |
|  | 1 | 0 | 1 | 1 | 0 |

During each time frame, optical timing control signal 162 is at a high power level except for a brief interval before the end of the time frame as previously described. While signal 162 is at a high power level, input storage array 132 emits an optical output signal 192(P,M) from each storage element representative of the information contained therein to encoder array 102. As previously described, switch control circuit 110 enables only a selected row of storage elements in encoder array 102 to store the information from the corresponding row of storage elements in input storage array 132. Another necessary condition for storing a row of information from storage array 132 in a row of encoder array 102 is that coherent bias beam 153 is at a low power level to allow each enabled encoder element to respond to the optical information signals from storage array 132. With the information stored in the enabled row of encoder array 102, coherent bias beam 153 returns to a high power level. As a result, optical information signal pairs 193(P,M) representative of the information stored in each bit of the enabled encoder row is emitted along with a low power level optical noise signal from each of the other elements in each column of the encoder array. The magnitude of each optical noise signal emitted from a column of the encoder cumulatively approximates a Gaussian distribution because of the Gaussian distribution of bias beam 153. All of the optical noise and information signal pairs emitted from the encoder array are then applied to distributor 103. During each time frame, switch control circuit 110 enables each encoder row once during a selected row cycle time period for the information signal pairs to pass through distributor 103.

Optical signal distributor 103 maps and, in particular, spatially distributes each optical information signal emitted from a storage element, also referred to as a pixel, in a selected encoder row to all the optical storage elements in the corresponding column of decoder array 104. More particularly, distributor 103 spatially distributes the input electric field pattern of the optical signal from each element in a column of the encoder array into an output electric field pattern having a magnitude for illuminating all of the elements in an individual corresponding column of the decoder array such that the magnitude of the output electric field pattern is a Fourier transform of the input electric field pattern. As described in the reference work of J. W. Goodman, entitled "Introduction to Fourier Optics", 1968, McGraw-Hill, page 5, the Fourier transform F of a complex function g of two independent variables, x and y, is mathematically defined by the following expression:

$$F(g) = \int_{-\infty}^{\infty} \int g(x,y)\exp[-j2\pi(f_x x + f_y y)]dx\,dy$$

Since distributor 103 contains cylindrical lenses as will be hereinafter described, the integration need be performed in only the y direction. As a result, the Fourier transform in only one dimension reduces to:

$$F(g) = \int_{-\infty}^{\infty} g(y)\exp[-j2\pi f_y y]dy,$$

where $g(y)=(x,y)$ which equals the electric field distribution pattern with x fixed at a given value of $x_1$.

With an optical signal spatially distributed about the entire height of a decoder array column, the decoder array, similar to the encoder array, enables one or more selected rows during each row cycle time period to store the information represented by the spatially distributed optical signals. Subsequently, the decoder array in response to clocked bias beam 154 emits another signal pair 194(P,M) from each element also representative of the information stored therein to a corresponding row in output storage array 133 of output system 105. Since only one of the storage elements in a column of the encoder array will be enabled to the distributor input at any time, the distributor is capable of broadcasting any row from the input storage array to any row of the output storage array. To accomplish this, the distributor must satisfy three requirements:

1. Center all the output beams about an the optical axis thereof and, in turn, about the midpoint of a decoder column,
2. Spread all the output beams across the entire height of the decoder array column, and
3. Control the horizontal spreading of the beams so that cross-talk between adjacent columns is reduced.

The first two requirements are met by the Fourier transformation performed by the distribution. The signal light in distributor 103 is simply the light that enters the system from the enabled optical element in encoder array 102. The only source of light in an ideal optical switch would be a high level optical information signal representing, for example, a logical "1" emitted from the enabled row of the encoder array. All of the other optical elements in the encoder array of an ideal system would be opaque and would contribute no light to the distributor. As a result, an ideal encoder array would require devices with contrast ratios equal to infinity. The contrast ratio equals the irradiance of light that is emitted from an enabled input optical element bit divided by the irradiance of light that is emitted from a disabled input optical element bit. Unfortunately, commercially available devices and most experimental devices only offer contrast ratios up to 100. Due to these relatively low contrast ratios, there will be a considerable amount of undesirable light entering the distributor from the disabled rows of the encoder. This light might be called "background" light because it originates from the background array elements surrounding the optical elements in the enabled row. Since the background light can interfere with the information signal light in the distributor, particularly low power level optical information signal pairs representing, for example, a logical "0" from the enabled row of encoder array 103 and cause bit errors at the decoder array, it might be also termed "background noise". Two types of background noise can be identified in optical switch 100. "Vertical background noise" is the background light that originates from the optical elements within the same column as the information signal light. "Horizontal background noise" is the background light that originates from optical elements in adjacent columns and diverges across the column boundaries. Vertical and horizontal background noise combine to form the total background noise in this optical switch.

In order to satisfy the three previously described requirements and minimize noise problems, distributor 103 comprises three subsystems: Fourier transformation subsystem 116, horizontal imaging magnification subsystem 117, and vertical magnification subsystem 118.

Figure 6:
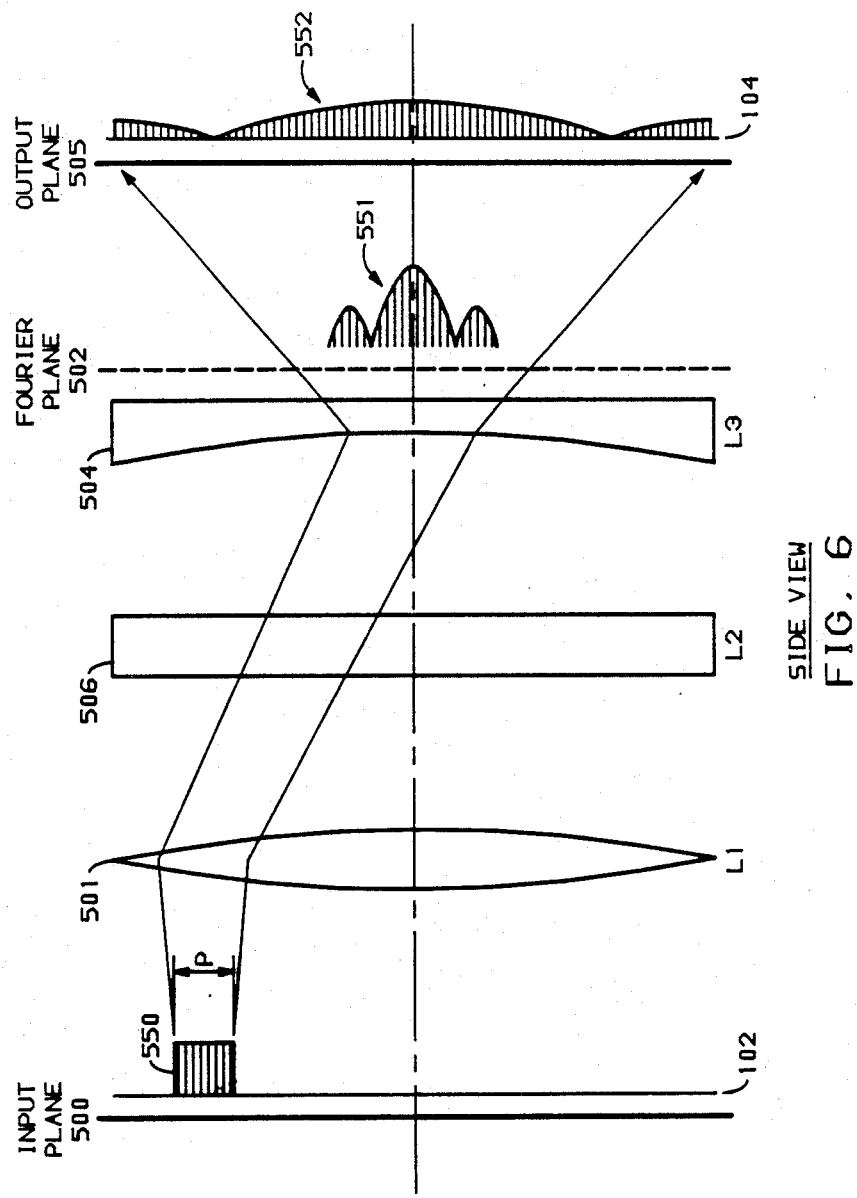
FIG. 6 depicts a side view of the distributor of FIG. 6.
Figure 7:
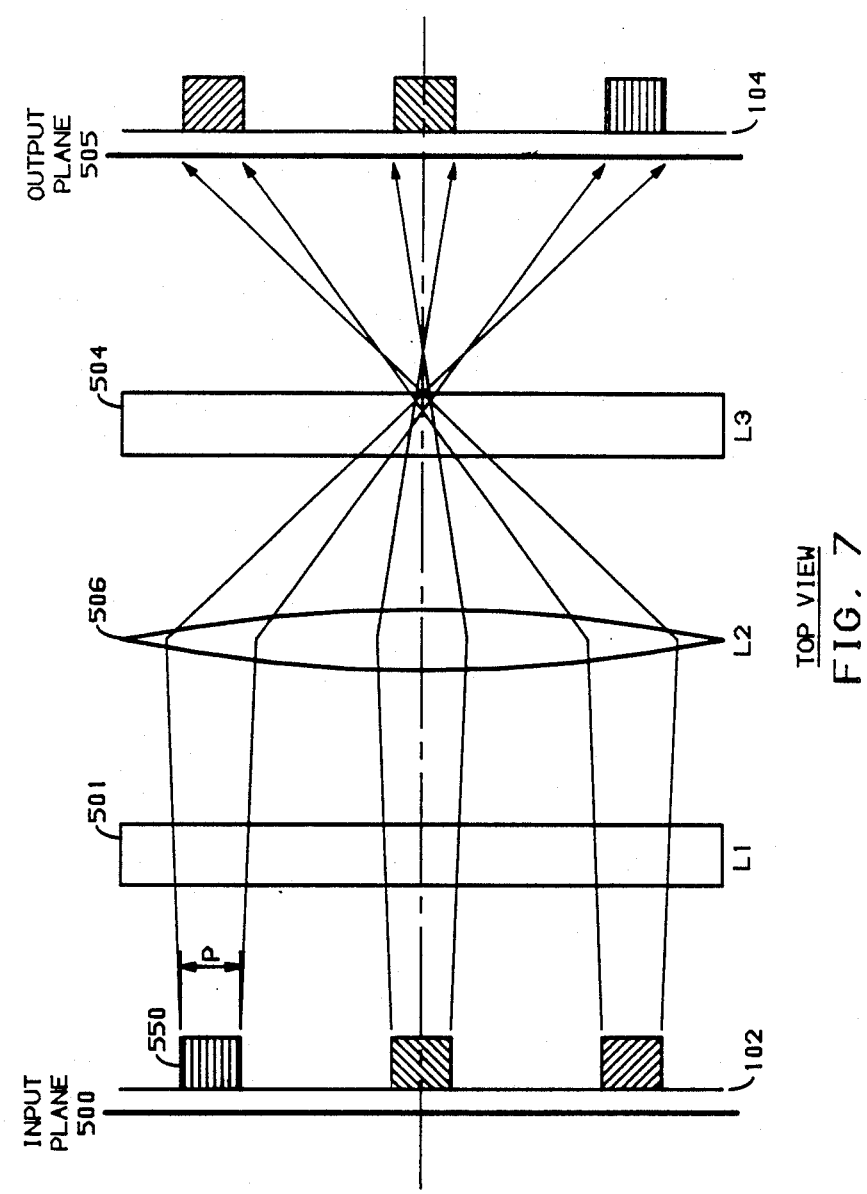
FIG. 7 depicts a top view of the distributor of FIG. 5.

Depicted in FIG. 5 is a detailed illustration of distributor 103 with subsystems 116, 117, and 118 with encoder array 102 positioned at the input plane 500 of distributor system 103 and decoder array 104 positioned at the output plane 505 of the distributor system. A side view of distributor 103 and its subsystems along with encoder array 102 and decoder array 104 of FIG. 5 is illustrated in FIG. 6. Depicted in FIG. 7 is a top view of the arrangement of FIG. 5. Fourier transformation subsystem 116 comprises a converging cylindrical lens 501, also labeled L1, which creates a one-dimensional Fourier transform of the input electric field pattern 550 at the input plane from optical element 102 (R1,C8) of encoder array 102 on its right focal plane 502. Since the distant $d_0$ from encoder array 102 to converging lens 501 is not necessarily equal to the lens's focal length, the image at focal plane 502 is actually the Fourier transform of the electric field pattern 550 from the encoder array multiplied by some phase terms. However, since the operation of the decoder array is responsive to only the magnitude of the light irradiance, these phase terms may be ignored. Upon transformation, the spatial frequencies present in the image of the encoder array appear as bright areas or spots in this focal plane. If the input image on the encoder array is a single square aperture with side lengths given by P, then the electric field distribution pattern in the vertical direction (i.e., the y direction), is given by:

$$rect\left(\frac{y}{P}\right) = \begin{cases} 1 \text{ if } \left|\frac{y}{P}\right| \leq \frac{1}{2} \\ 0 \text{ if } \left|\frac{y}{P}\right| > \frac{1}{2} \end{cases} \quad (1)$$

If the converging lens 501 has focal length $f_1$, then the Fourier transform 551 imaged in the vertical direction on the lens's right focal plane will be an electrical field roughly described by $$F\left\{rect\left(\frac{y}{P}\right)\right\} = P\left\{\frac{\sin\left(\frac{\pi P y}{\lambda f_1}\right)}{\frac{\pi P y}{\lambda f_1}}\right\}. \quad (2)$$

This is a familiar $sinc(y)=\sin(\pi y)/(\pi y)$ function in the vertical direction. Since only the irradiance within this plane will be detected, the detected signal is proportional to the square of the Fourier transform ($sinc^2$), which is the power spectrum of the input image. Regardless of the vertical position of the square aperture in the encoder array, the power spectrum (and the main lobe of the $sinc^2$ pattern) is always centered at the optical axis of converging lens 501. Thus, the first of the three requirements is satisfied. Since most of the energy of the "on" optical element is contained in this main lobe, this is the portion of the output image 552 that will be used in detection at the output plane 505 where decoder array 104 is positioned. Unfortunately, the vertical spread of this lobe of the sinc² function may not be large enough to satisfy the second distributor requirement, because its first vertical zero is at the point where:

$$F\left\{ rect\left(\frac{y}{P}\right)\right\} = 0 \tag{3}$$

which is given by: $y = \lambda f_1/P$.

The vertical magnification subsystem 118 increases the vertical spread of the sinc² function to satisfy the second distributor requirement by spreading the output beams across the entire height of the decoder array columns. Many well-known optical imaging systems may also be used to magnify the Fourier distribution in the output plane. Preferably, vertical magnification subsystem 118 comprises a single cylindrical diverging lens 504, also labeled L3, which images the Fourier transform at focal plane 502 onto output plane 505 were the decoder array is positioned. Since diverging lens 504 is placed to the left of the Fourier plane, the Fourier transform image is vertically magnified and appears at the output plane instead of the Fourier plane. If the distance from the diverging lens to the Fourier transform plane is given by $s_o$ (a negative number), and the distance from the diverging lens to the image in the output plane is given by $s_i$, then the first vertical zero of the magnified (or scaled) sinc function in the output plane is at the point where:

$$F_{scaled}\left\{ rect\left(\frac{y}{P}\right)\right\} = 0$$

which is given by $$y = \left(\lambda \frac{f_1}{P}\right)\left(\frac{s_i}{s_o}\right). \tag{4}$$

$F_{scaled}$ represents the magnified Fourier transform 552 resulting in the output plane. Assuming the paraxial approximation is valid, the well-known Lens Equation and the equation describing lens magnification yield two equations which are extremely useful for system design:

$$s_i = f_2(1 - M_{required}), \tag{5}$$

$$s_o = f_2\left(1 - \frac{1}{M_{required}}\right), \tag{6}$$

where $M_{required}$ is the system magnification required to spread the main lobe of the sinc function across the entire output plane 505 and $f_2$ is the negative focal length of the diverging lens.

In order to provide adequate magnification, the distance $s_i$ will often be large. As a result, a beam propagating through the system will experience horizontal divergence, and the beam width b may become excessively large since the beam width is approximately given by:

$$b = \frac{P}{2}\left(1 + \frac{\lambda^2 z^2}{\pi^2 \frac{P^4}{16}}\right)^{\frac{1}{2}}, \tag{7}$$

where z is the total system length. This can lead to horizontal noise problems between adjacent columns in the system.

Horizontal imaging subsystem 117 controls these horizontal noise problems by imaging the diverging beams in the horizontal direction as shown in FIG. 7. This re-focusing of the light provides many benefits, because stray light that would have been noise in the system can be redirected back to useful spots in the output plane to increase the output signal levels. Horizontal imaging subsystem 117 comprises imaging lens 506, also labeled L2, which is a cylindrically converging lens that is rotated 90 degrees from the horizontal orientation of the other two lenses as shown in FIGS. 5-7. If the focal length of lens 506 is $f_3$, the distance from the encoder array is given by $s_1 = 2(f_3)$, and the distance from the re-focusing lens to decoder array is given by $s_2 = 2(f_3)$. As a result, the re-focusing lens will restore every input beam to its initial horizontal width and will redirect every input beam to its conjugate point in the output plane as shown in FIG. 6. Horizontal magnification and minification of the propagating beams can be controlled by carefully varying the distances $s_1$ and $s_2$. As a result, the third distributor requirement is also satisfied, beacause horizontal spreading is contained.

Before considering the output waveform which results from a column of optical elements in the encoder array 102, it is instructive to discuss the output waveform which results from a single optical element in the encoder array. The presence of a single optical element in the input plane implies that the switch uses an encoder array with ideal optical devices having a contrast ratio of infinity. Assuming a single element (width=P) is enabled in the ideal encoder array, then the electric field waveform pattern $E_{pixelout}$ resulting in the output plane is approximately described by $$E_{pixelout} = E_p\left\{\frac{\sin\left(\frac{\pi P y}{\lambda f_1}\frac{s_o}{s_i}\right)}{\frac{\pi P y}{\lambda f_1}\frac{s_o}{s_i}}\right\} rect\left(\frac{x}{P}\right). \tag{8}$$

Figure 8:
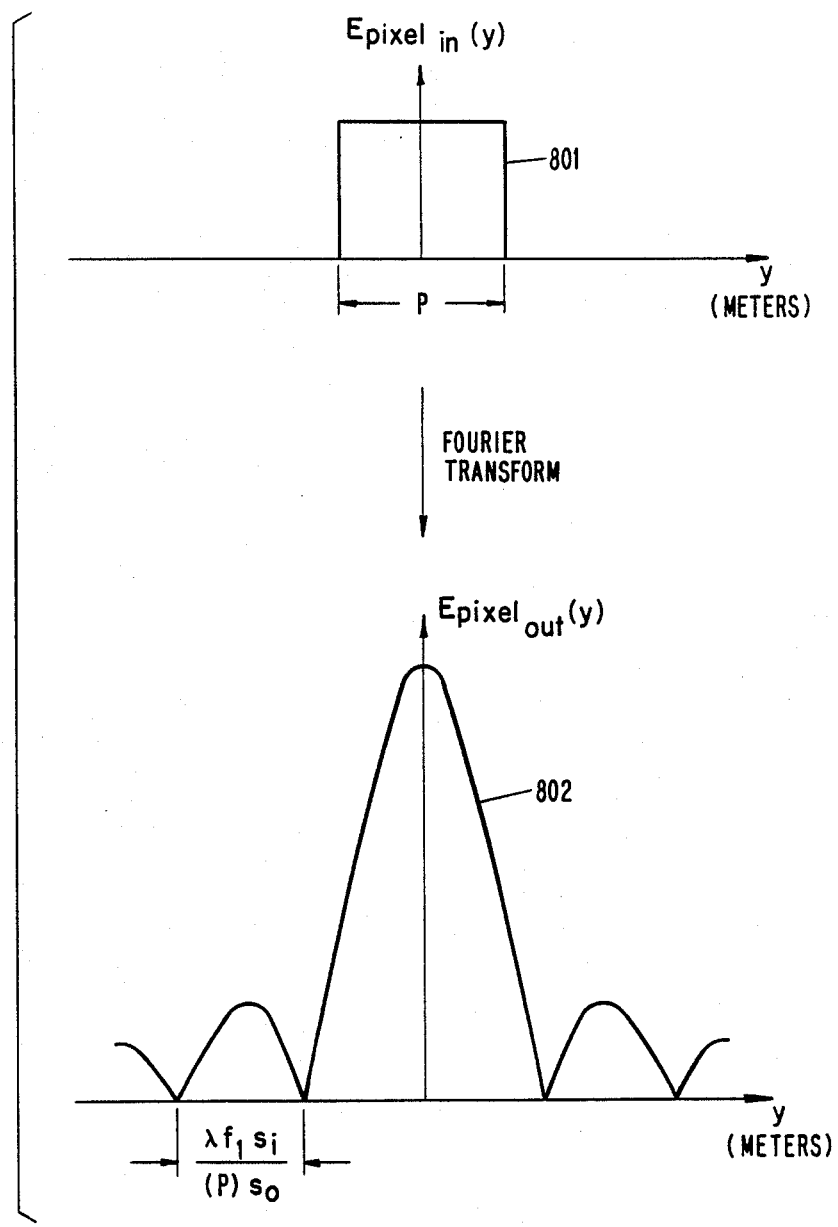
FIG. 8 depicts illustrative waveforms of an input electric field of a single encoder element and the resultant Fourier transform present at the decoder array of the optical switch of FIG. 1.

At the input plane, the vertical electric field waveform $E_{pixel\ in}$ (y) produced by the optical element is a rectangular distribution 801 as shown in FIG. 8. Due to Fourier transforming lens 501, the electric field waveform pattern in the vertical direction of the output plane is a sinc distribution 802 described by $E_{pixelout}$ (y) as shown in FIG. 8. Again the image actually detected in the vertical direction of the output will be a sinc² shape with zero spacing described by Equation 4. It is important to note that the main lobe of the sinc becomes wider as the optical element dimensions are decreased. It is also important to note from Equation 8 that the beam provided in the horizontal direction of the output plane can be closely approximated by a rectangular distribution of width P.

Figure 9:
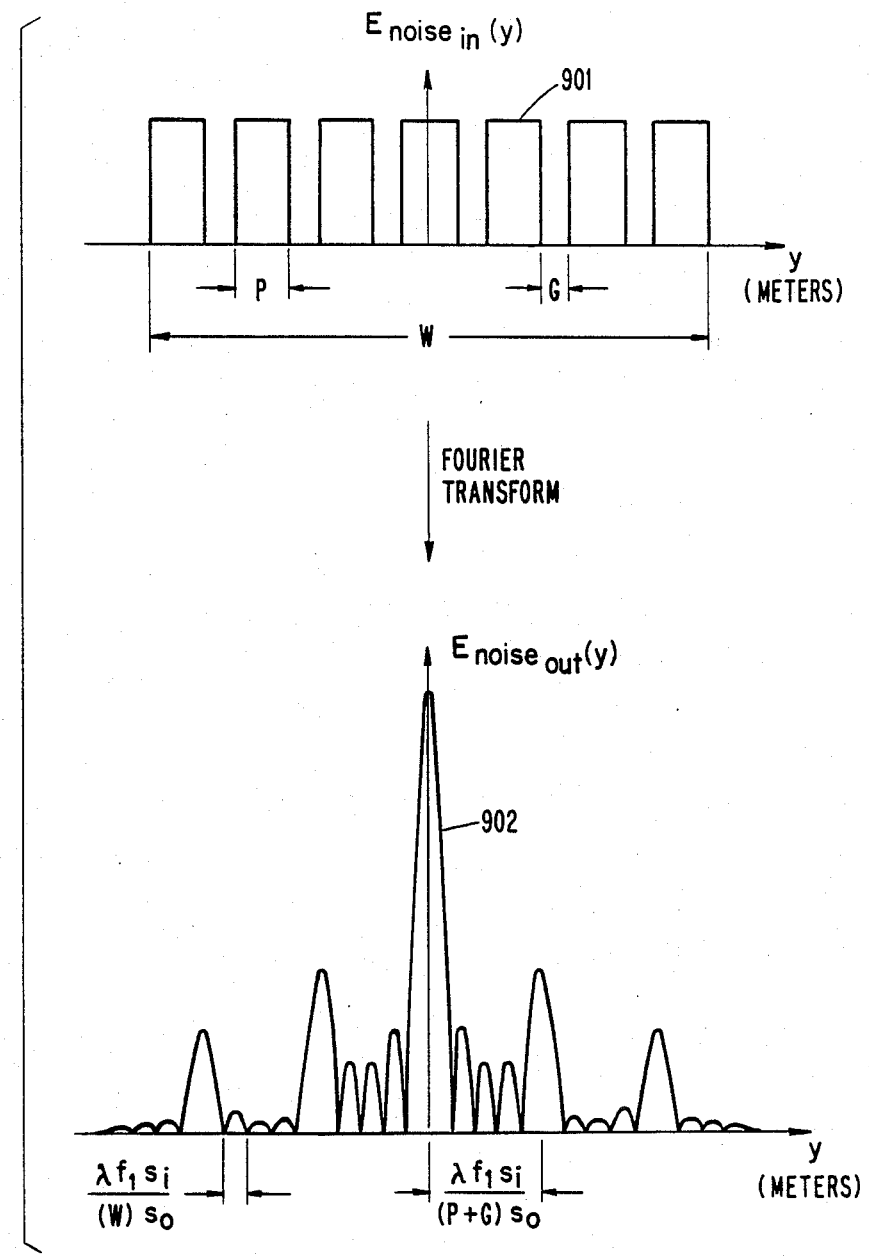
FIG. 9 depicts illustrative waveforms from the optical elements in a column of the decoder array and the resultant Fourier transform present at the decoder array in the optical switch of FIG. 1.

When all of the optical elements in the input plane are disabled, they form an electric field distribution pattern which is similar to a square-wave when viewed down any column. This square-wave distribution will probably be observed for most encoder arrays, because most devices are manufactured in regular array structures. This regular input electric field distribution pattern 901 corresponds to the noise input $E_{noisein}(y)$ as shown in FIG. 9. Thus, the electric field distribution pattern 902 in the vertical direction can be described by:

$$E_{noisein}(y) = E_n \sum_{i=-\infty}^{i=+\infty} rect\left(\frac{1}{P}\left[y - \frac{i}{(P+G)}\right]\right), \quad (9)$$

where P is the optical element size and G is the gap size, between elements. Since the encoder is actually of finite spatial extent, this image is actually windowed by a windowing function, w(y). Thus, it can be shown that $$E_{noisein}(y) = E_n w(y) \sum_{i=-\infty}^{i=+\infty} rect\left(\frac{1}{P}\left[y - \frac{i}{(P+G)}\right]\right) = \quad (10)$$

$$E_n w(y)\left[rect\left(\frac{y}{P}\right) * comb\left(\frac{y}{P+G}\right)\right]$$

where * denotes the convolution operation, and comb-(y/(P+G)) is a train of Dirac delta functions spaced by distance P+G. Using a thresholding encoder with all rows disabled, all elements in the input image will have approximately the same irradiance. Thus, the vertical electric waveform, $E_{noisein}(y)$, will be present at the input plane, and the vertical electric field waveform pattern $$E_{noiseout}(y) = F_{scaled}\{E_{noisein}(y)\} \quad (11)$$

will result in the output plane. In the output plane, the effect of having multiple source elements emitting at the input plane rather than a single source element is rather dramatic:

$$E_{noiseout}(y) = F_{scaled}\{E_{noisein}(y)\} = E_{nout}W(y) * \quad (12)$$

$$\left\{sinc\left(y\frac{Ps_o}{\lambda f_1 s_i}\right) comb\left(\frac{y[P+G]s_o}{\lambda f_1 s_i}\right)\right\}.$$

Assuming the input image is windowed by rect(y/W), where the window length W is much greater than the element size P, then $$W(y) = F_{scaled}\{w(y)\} = E_{wout} sinc\left\{y\frac{Ws_o}{\lambda f_1 s_i}\right\}. \quad (13)$$

The output waveform is a train of narrow sinc pulses having center-to-center spacings $\lambda f_1 s_i/((P+G)s_o)$ where P is the element size and G is the gap size between elements as shown in FIG. 9. Each of the sinc pulses has its zeroes spaced by $\lambda f_1 s_i/(Ws_o)$, and the whole pulse-train is modulated by $E_{pixelout}(y)$ which is a wide sinc. The main lobes of the sinc pulses decrease in width as the window length W is increased (i.e., as the encoder array is increased in size). In addition, the elements and the inter-element gaps in the encoder array are decreased in size, the spacing between the sinc pulses in the output plane will increase, since the square-wave image now possesses higher spatial frequencies.

Figure 10:
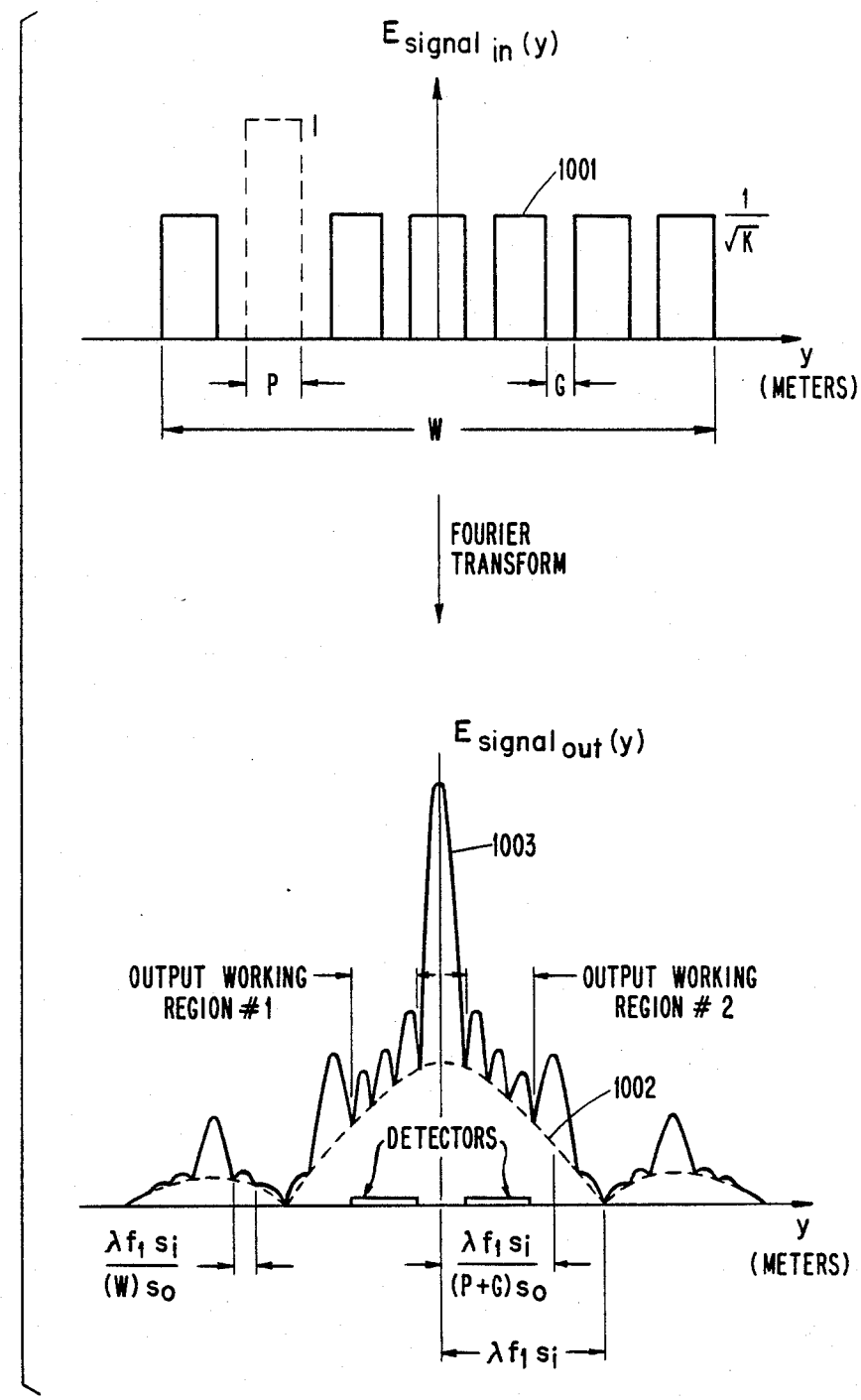
FIG. 10 depicts illustrative waveforms of a combination of illustrative noise waveforms and a single optical information signal from a column of the encoder array and the resultant Fourier transform on the decoder array and the optical switch of FIG. 1.

When all of the elements in the encoder array are disabled except for one, then the electrical field waveform distribution pattern 1001 described by $E_{signalin}(y)$ will be present at the input plane as shown in FIG. 10. It can be shown that $$E_{signalin}(y) = AE_{pixelin}(y) + E_{noisein}(y). \quad (14)$$

A is a constant described by the equation $A = 1 - 1/29 k$, where k is the contrast ratio of the devices in the encoder array. Since the vertical electric field distribution waveform pattern in the output plane is given by $$E_{signalout}(y) = F_{scaled}\{E_{signalin}(y)\}, \quad (15)$$

and the Fourier transform is a linear operator, it follows that $$E_{signalout}(y) = AE_{pixelout}(y) + E_{noiseout}(y), \quad (16)$$

as shown in FIG. 10, where $E_{pixelout}$ is shown as dotted line 1002, and $E_{noiseout}$ is shown as solid line 1003.

FIG. 10 also illustrates the two "output working regions" where the output signal is sampled by detectors such as the optical device elements in decoder array 104 positioned at the output plane. These regions are within the main lobe of the wide sinc distribution resulting from the information signal, but they are bounded by the main lobes of the narrow sinc distribution resulting from the background noise. Thus, the optical detector avoids the background noise by sampling the high irradiance in the main lobe of the output information signal while sampling only the low irradiance in the side lobes of the output noise. When the decoder elements are positioned accordingly, the low irradiance of the noise signals should be negligible when compared with the high irradiance of the information signal.

In order to characterize the operation of the distributor 103, it is helpful to define the signal-to-noise ratio (SNR) for the switch. Due to the variations in the electric field distribution waveform patterns across the output plane, it should be apparent that the output signal-to-noise ratio will be dependent on the sample location in the output plane. As a result, it will be interesting to examine the signal-to-noise as a function of the vertical displacement from the optical axis of the distributor. This function will be called SNR(y).

Before SNR(y) is defined, the terms "noise signal" and "information signal" must first be defined as they apply to the electric field waveform. The background "input noise" is defined as the electric field waveform which exists when none of the optical elements in encoder array 102 are enabled. This corresponds to the waveform 901 described by $E_{noisein}(y)$ as shown in FIG. 9, and the resulting output noise is then described by the waveform 902 described by $E_{noiseout}(y)$. As previously described, this noise is the undesired light which enters the system through the disabled encoder elements when bias beam 153 is applied. The Fourier transforming properties of a lens are used to force this noise to discrete regions in the output plane.

The input "information signal" in the system is defined to be the electric field waveform which exists when a single optical element is turned "on" in the encoder array and emits a high power level optical signal relative to the power level of the noise signals. Since the light from the disabled elements is also present when the enabled element is on, this light must also be considered to be part of the input signal. As a result, waveform 1001 described by $E_{signalin}(y)$ as shown in FIG. 10 represents the input signal, and waveform 1003 described by $E_{signalout}(y)$ represents the output signal. As a result, $$SNR(y) = 20 \log \left( \frac{E_{signalout}(y)}{E_{noiseout}(y)} \right). \quad (17)$$

To permit the use of low contrast ratio devices in encoder array 102, windowing techniques which are employed in digital signal processing applications are utilized. The study of windows and digital signal processing results from the requirement that all signals be truncated to some finite duration prior to application of digital signal processing techniques. Straight-forward truncation of a signal is equivalent to multiplying the signal by a rectangular window as was previously described. In the frequency domain, the resulting Fourier transform of the truncated signal is the Fourier transform of the initial untruncated signal convolved with the Fourier transform of the rectangular window (see equation 12). Since the Fourier transform of the rectangular window is a sinc function, the side lobes of the sinc curve lead to spreading of energy around the initial signal's spectral distribution. As a result, the use of a rectangular window tends to widen the bandwidth of the initial signal's Fourier transform. This phenomenon is often termed spectral leakage, and it will be observed for any window one chooses to use in truncation and not just for rectangular windows. The amount of energy that spreads into the side lobes is a function of the window that is used. The Fourier transform of a rectangular window tends to have narrow main lobes and high side lobes. The Fourier transform of other windows such as the triangular window, the Hanning window, the Hamming window, and the Gaussian window have wider main lobes and lower side lobes. Windows with low side lobes can be used to improve the signal-to noise-ratio in optical switch 100.

In order to see how windowing techniques can be employed in optical switch 100, it is important to realize that the final height of the encoder array 102 effectively windows the periodic distribution of light irradiance that is formed by the elements in the encoder array. A better way to visualize this is to imagine that encoder array 102 extends to infinity in the vertical dimension. As a result, the elements in the encoder array. A better way to visualize this is to imagine that encoder array 102 extends to infinity in the vertical dimension. As a result, there would be an infinite number of rows in the switch. If this were the case, then the Fourier transform of the infinite square-wave existing at the input plane would be a train of delta functions of varying height. Now if the mask is placed in front of the infinitely long encoder array to block out all but a few of the rows, then the input signal has obviously been windowed using a rectangular window, and the delta functions in the Fourier plane are spread out as a result of spectral leakage. If one uses a window other than the rectangular window, this spectral leakage can be minimized. The use of Fourier techniques and windowing techniques in the optical domain requires that the system use coherent illumination such as from coherent optical source 114.

The irradiance profile of most lasers is Gaussian in shape so a Gaussian window can be easily constructed using an imaged laser beam as bias beam 153 on the encoder array as formed by anamorphic beam shaping system 115.

The effects of a Gaussian window being applied to distributor 103 are significant. The Gaussian window provides dramatic signal-to-noise ratio improvements over the rectangular window in the output regions between the noise peaks. These signal-to-noise ratio gains are a direct result of the fact that the side lobes of noise signals are greatly suppressed when the encoder array is illuminated with a Gaussian window as with beam shaping system 115 illuminating encoder array 102.

Unfortunately, these increased signal-to-ratios are not obtained for free. There are tradeoffs that must be considered. The first tradeoff is a result of the fact that the main lobe of the noise peaks in the noise signal grow wider as the Gaussian beam width is decreased. As a result, the output working regions with a high signal-to-noise ratio tend to decrease in size, and this leads to less vertical distance for output sampling in the decoder array 104.

The second tradeoff is that encoder array 102 rows illuminated by the tails of the Gaussian beam will not produce sufficient light to switch the devices in the output plane. As a result, these input rows cannot be used in the switching operations. In effect, there is a region of usable input rows near the center of the Gaussian beam called the "input working region." . As an optical element is moved from the center of the Gaussian beam out toward the tail, the signal-to-noise ratio drops. It is important to note that the input working region is a function of the Gaussian beam width as well as the required signal-to-noise ratio in the output plane.

When all the elements in the encoder array are disabled, the finite contrast ratio k of a practical system will allow some of the light to pass through the encoder array. The encoder array must also perform a thresholding function so that all of the "off" elements (both within the enabled row and in other rows) in the Fourier transform input plane have the same irradiance or electric field magnitude. A problem can arise if a linear non-thresholding encoder array is used, because both on and off elements can exist in rows of the input storage array that are not enabled in the encoder array. The different irradiances from these elements can propagate through a linear encoder array, because a linear encoder will simply multiply the incident magnitude by $1/\sqrt{k}$. This will result in two different "off" irradiances for information bits in the disabled rows. As a result, the periodicity of the input image is destroyed, and the signal-to-noise ratio advantages are lost.

This potential problem is eliminated by using thresholding gates in the encoder array 103. Another solution can be realized if the encoder array is constructed with latching devices such as the three-state symmetric self electro-optic effect devices as previously referenced and described. The operation of optical switch 100 requires only one row to be latched into the encoder array at any point in time as previously described.

Figure 14:
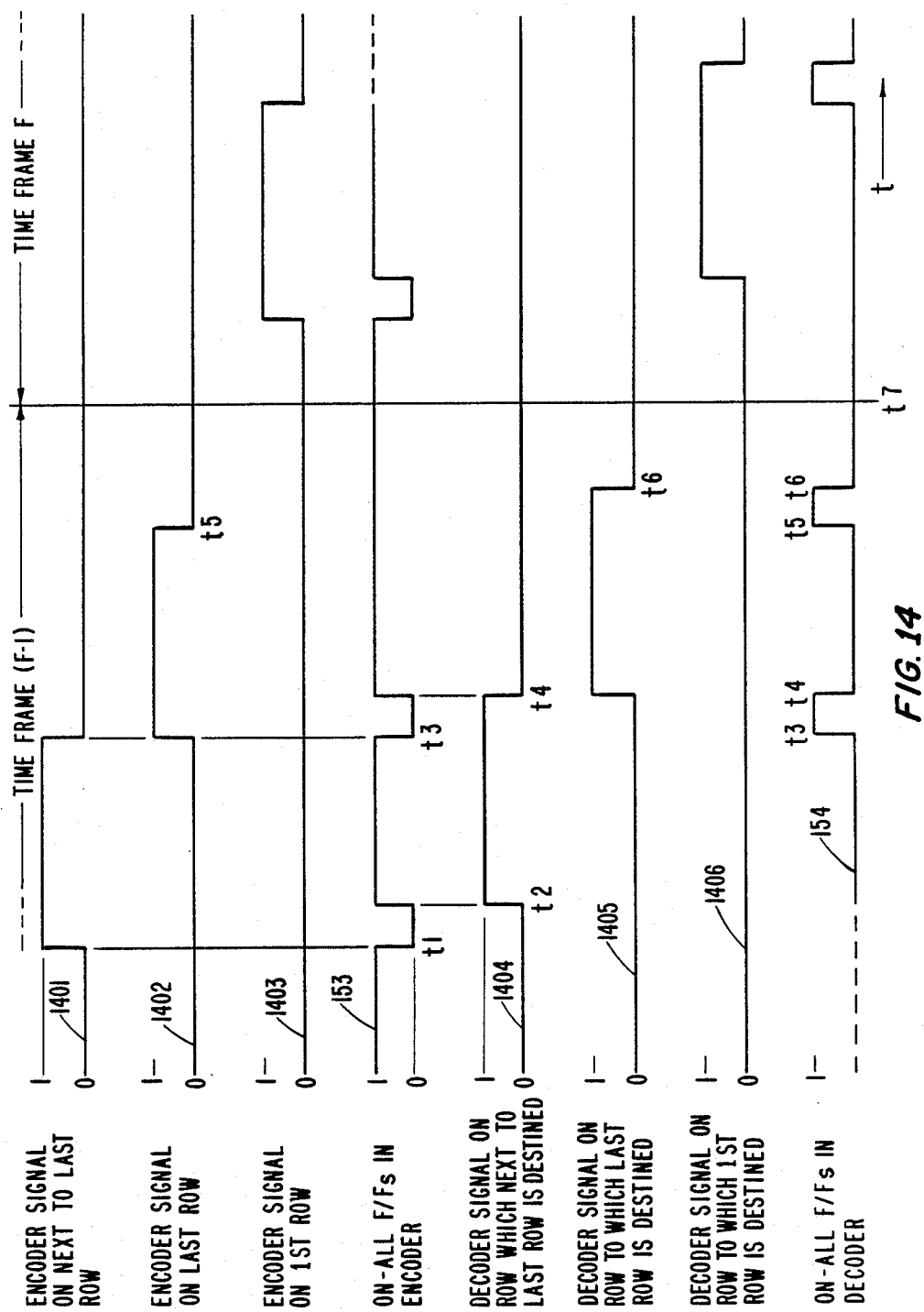

Depicted in FIG. 14 are three idealized electronic, encoder timing control signals 1401–1403 that are sent from switch control circuit 110 to encoder 102 via bus 172 for selectively switching through distributor 103 three different time slots or words of data that are stored in the rows of input storage array 132. The first two rows of information to be switched through the distributor, as depicted in FIG. 14, are stored in the next to last storage array row 132R(P-1) and the last row 132RP. This information was previouuly stored in the inpu storage array near the end of time frame (F-1). The third row of information to be switched through the distributor, as shown in FIG. 14, is stored in the first storage array row 132R1. This third row of information was stored during time frame F. The timing in the distributor system is synchronized to a well-known internal clock of switch control circuit 110. A distributor system timing requirement is that the low power level pulse of optical timing signal 162, as shown between times t6 and t7 in FIG. 13, does not coincide with any of the high power level pulses of encoder control signals 1401-1403 or any of the high power level pulses of decoder control signals 1404-1406 that are sent by switch control circuit 110 to decoder array 104 via bus 173. Thus, optical timing control signal 162 must be at a high power level during the switching through the distributor system of each selected storage array row of information.

To switch the information in the next to last input storage array row 132R(P-1) through the distributor, the switch control circuit causes encoder control signal 1401 which is associated with the chosen row, to transition to a high power level (1) at time t1 to electrically enable the devices in the row. All of the other rows in encoder 102 remain electrically disabled with their control signals at a low power level (0). While encoder signal 1401 is at a high power level, control circuit 110 causes coherent light source 114 via bus 168 to emit a low power level pulse between times t1 and t2 so that bias beam 153 incident on all of the flip-flop pairs in encoder 102 pulses low. Since timing control signal 162 which is incident on all of the flip-flop pairs in input storage array 132, is at a high power level when bias beam 153 is pulsed low, all of the data stored in the input storage array propagates therefrom via information signal pairs 192 (P,M) to encoder array 102, however, information is stored only in the enabled encoder row 102R(P-1). With the data stored in the enabled encoder row, bias beam 153 returns at time t2 to a high power level, and the information stored in the enabled row of encoder array 102 passes through the distributor system 103 to decoder array 104. Also at time t2, decoder control signal 1404 assumes a high logic level (1) and electrically enables the elements in the decoder row or rows to receive the optical information signal pairs. During time interval t2-t3, clocked light source 145, which is controlled by switch control circuit 110 via bus 169, pulses bias beam 154 to a low power level to enable optically the decoder array elements to receive the optical information signal pairs passing the distributor. As a result, information represented by information signal pairs that passes through distributor 103 is stored in the flip-flop pairs of the electrically and optically enabled rows in decoder array 104.

After the data is stored in the enabled decoder array rows of 104, light source 145 pulses beam 154 at time t3 to a high power level so that the rows of information or data that were just stored in the decoder array 104 propagate between times t3 and t4 to the corresponding rows in output storage array 133 of output system 105. Since light source 142, which is controlled by switch control circuit 110 via bus 176, maintains bias beam 156 incident on output storage array 133 at a low power level, the information in the enabled decoder row is stored in the corresponding row of the output storage array. The information is stored in the output storage array between times t3 and t4 when control timing signal 154 pulses to a high power level on decoder array 104. All the other rows of the decoder array are disabled and send out a pair of optical signals which are both at a low level. As a result, these low power level optical signal pairs do not affect the information stored in the incident output storage array rows. At time t4, electrical decoder control signal 1402 returns to a low logic level (0), and optical control signal 154 returns to a low power level, thus electrically and optically disabling decoder array row 104R(P-1).

At time t3, the aforementioned sequence is repeated when encoder bias beam 153 pulses to a low power level and encoder control signal 1402 assumes a high logic level so that the last encoder row 102RP is electrically enabled. As a result, the information stored in the corresponding input storage array row 132RP is transferred in parallel to start the next cycle of the row switching process. When encoder bias beam 153 returns to a high power level at time t4, a new row of information represented by information signal pairs propagates through the distributor to the decoder array. At the same time, decoder control signal 1405 changes to a high power level to enable a new decoder row, and decoder bias beam 154 changes to a low power level to enable the information from the enabled encoder array row to be stored in the decoder array. At time t5, encoder signal 1402 changes to a low logic level to electrically disable encoder array row 102RP, and decoder bias beam 154 returns to a high power level to pass the last row of data from the decoder to the output storage array. At time t6, decoder signal 1405 and bias beam 154 change to a low level to allow the next row of data from the distributor to be stored in the decoder.

After all of the rows of information of time frame (F-1) in input storage array 132 have been transferred to the output storage array 133, the aforementioned process is repeated for the first row of information of time frame F in the input storage array, which involves encoder control signal 1403 and decoder control signal 1406 as shown in FIG. 14.

Similar to encoder array 102, decoder array 104 comprises a plurality of optical storage elements such as the three-state symmetric SEEDs aligned in rows 104R1-104RP and columns 104C1-104CM as depicted in FIG. 1. Switch control circuit 110 via bus 173, enables one or more of the decoder array rows to store information represented by the information signal pairs that are distributed entirely over each corresponding pair of columns. After the information is stored in the enabled row(s) of decoder array 104, a well-known polarization-type beam splitter 119 that is interposed between distributor system 103 and decoder array 104 applies a clocked optical power signal such as bias beam 154 from clocked optical source 145 to each of the devices of the decoder array as previously described. The magnitude of this clocked decoder bias beam is uniform. The bias beam is applied either from a coherent or incoherent light source to the entire decoder array as previously described and depicted in FIG. 14. Only the elements in an enabled row of the decoder array emit a complementary optical signal pair having both a high and low power level representative of the information contained therein for storage in output system 105. Each element in a disabled row of elements emits a pair of low power level optical signals as indicated in Table A. As described in the "Symmetric Optical Device" reference, a predetermined ratio of the power of the two optical control beams must be present to change the state of the symmetric SEED. Since the power level of the optical output signal pair from each disabled decoder element are the same, the optical output signal pair will not change the state of the symmetric SEED storage elements in output system 105. The ratio of the high and low power level optical output signals representative of the information in each of the enabled decoder elements, however, is sufficient to change the state of the storage elements in the output system. Thus, only the information from the enabled decoder row is stored in the output system.

Figure 11:
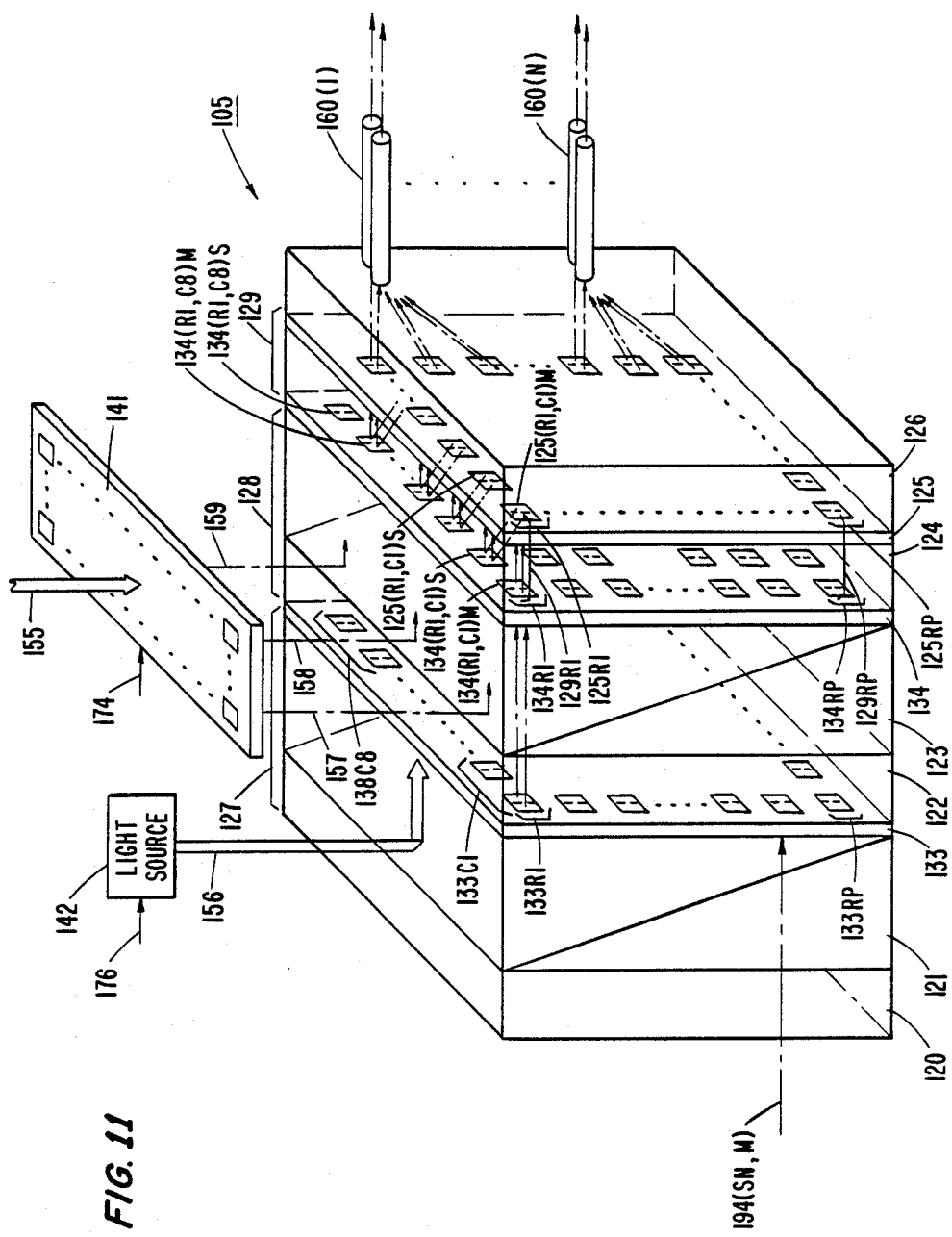
FIG. 11 is a detailed drawing of the output system of the optical switch of FIG. 1.

Depicted in FIG. 11 is a detailed illustration of optical output system 105 including output storage array 133 for storing rows of information selected by decoder array 104 and output shift register unit 129 for converting the stored information from a spatially-separated format to a temporally-separated format for serial transmission on an associated pair of output pairs 160(1)–160(N). The output system comprising output storage array 133 and output shift register unit 129 is interleaved between interface units 127 and 128 and optically transparent material 126.

Output storage interface unit 127 includes a well-known imaging system 120 for imaging the optical signal pairs 194(P,M) from the elements of decoder array 104 through beam splitte 121 onto the receiving surface of each correspondingly positioned optical storage element in output storage array 133. Well-known polarization-type beam splitter 121 directs clocked optical bias beam 156 from optical source 142 to each of the optical storage elements in output storage array 133.

Similar to input storage array 101, output storage array 133 comprises a plurality of optical storage elements such as the symmetric SEED periodically aligned in 133R1–×RP rows and columns 133C1–133C8. Responsive to bias beam 156, output storage array 133 emits a pair of complementary optic information signals from each of its storage representative of the information contained therein for storage in output shift register unit 129. After the information from one time frame period is stored in the output shift register unit, the output storage array is ready to store another time frame of switched information from decoder array 104 while the information stored in the shift register unit is being serially shifted onto output fiber pairs 160(1)–161(N).

An optical shift register interface unit 128 is layered between output storage array 133 and shift register unit 129 for imaging the optical signals from the storage array onto the corresponding master storage elements of the output shift register unit and for applying optical timing control signals 157–159 to the shift register unit elements. Switch control unit 100 via bus 174 controls spatial light modulator 141 that emits optical timing control signals 157–159 in response to optical power signal 155 from an optical source not shown. The shift register interface unit comprises imaging system 122 for imaging the optical signals from each storage array device onto the receiving surfaces of each correspondingly positioned master SEED element of the shift register unit. Well-known polarization-type beam splitter 123 directs the timing signals to each of the storage elements of shift register unit 129.

Similar to input shift register unit 131, output shift register unit 129 comprises a plurality of optical shift register rows 129R1–129RP for serially shifting the information contained therein in a spatially-separated format onto an associated pair of output optical fiber pairs 160(1)–160(N) for transmission in a temporally-separated format. The output shift register unit 129 includes optical storage element array 134 arranged in rows 134R1–134RP and columns 134C1–134C8 and a similar array of holograms 125 arranged in rows 125R1–125RP and columns 125C1–125C8. An optically transparent spacer material 124 is positioned between the storage element and hologram arrays. Each column includes a pair of optical storage elements designated master and slave for storing and shifting a bit of information. A corresponding pair of reflection holograms in array 125 facing the storage element pair optically interconnects the pair to form a well-known master-slave flip-flop configuration. The storage element pairs in each row are also optically interconnected by the oppositely facing hologram to form an optical shift register row for shifting complementary optical information signals from one storage pair to another. For example, the first master-slave pair of storage elements in row 134R1 are designated 134(R1, C1)M and 134(R1,C1)S, whereas the last pair in the row is designated 134(R1,C8)M and 134(R1,C8)S. The oppositely facing hologram are similarly designated as shown.

Figure 15:
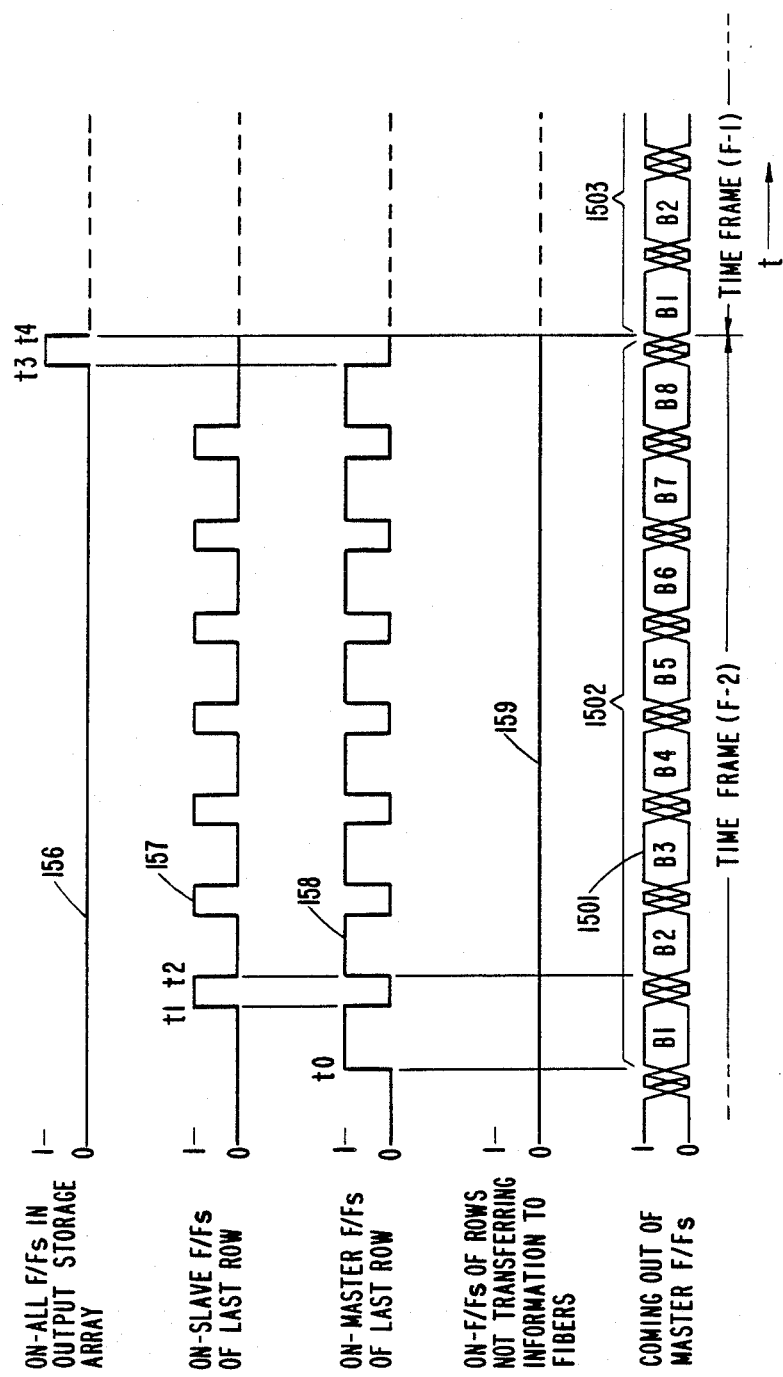

Depicted in FIG. 15 is an illustrative timing diagram with respect to time, t, of representations of idealized optical timing control signals 157–159, clocked optical bias beam 156, and complementary optical information signal pair 1501 on output fiber pair 160(1). As shown, complementary optical information signal pair 1502 represents the last time slot or word of data, which comprises eight bits of information B1–B8, in time frame (F-2). Signal pair 1503 represents the first few bits of the first time slot or word of data in time frame (F-1). The information from time frame (F-2) was transferred from the output storage array 133 to the output shift register unit 129 when bias beam 156 pulsed a high power level at the end of previous time frame (F-3) similar to bias beam 156 between times t3 and t4. Since electronically controlled spatial light modulator 141 maintains timing control signals, 157, 158, and 159 at a low power level during this interval, the data represented by information signal pairs propagates from output storage array 133 to output shift register unit 129. As a result, the data is stored in the flip-flop pairs of the output shift register unit 129. When stored in the output shift register unit the data, for example, in row 129R1–129R3 is shifted out onto a single output fiber pair 160(1) one row at a time. Bias beam 159 remains at a low power level for all the output shift register rows that are not transferring information to an output fiber pair.

Output shift register unit 129 includes optical storage element array 134 arranged in rows 134R1–134RP and columns 131C1–134C8 and a similar array 125 of holograms arranged in rows 125R1–125RP and columns 125C1–125C8. An optically transparent spacer material 124 is positioned between the storage element and hologram arrays. Each column of array 134 includes a pair of optical storage elements designated master and slave for storing and shifting a bit of information. A corresponding pair of holograms in array 125 facing the storage element pair optically interconnects the storage element pair to form a well-known master-slave flip-flop configuration. The storage element pairs in each row are also optically interconnected by the hologram pairs to form an optical shift register row for shifting a pair of complementary optical information signals from one storage element pair to another. For example, the first master-slave pair of storage elements in row 134R1 are designated 134(R1, C1)M and 134(R1, C1)S, whereas the last pair in the row is designated 134(R1, C8)M and 134(R1, C8)S. The oppositely facing holograms are similarly designated as shown.

Shifting the eight bits of information B1-B8 stored in a row of output shift register array 129 is accomplished in a manner very similar to the manner described for input shift register unit 131. Assuming bit B1 is stored in the master flip-flop storage element 134(R3, C8)M, and each of the other bits B2-B8 is stored in another master flip-flop storage element in row 134R3, then shifting the data requires timing signal 158 to be directed at all master flip-flop storage elements in the row, and timing signal 157 to be directed at all slave flip-flop storage elements in the same row. As shown in FIG. 15 bias beam 158 at time t0 pulses to a high power level in only the row that complementary information signal pairs are being shifted out onto the output fiber pair. The high power level bias beam 158 on the master flip-flop storage elements causes information signal pairs to be emitted from master flip-flop storage elements and directed to the oppositely facing hologram in array 125, where the signals are redirected back to adjacent slave flip-flop storage element in the pair. Since bias beam 157 is at a low, power level between times t0 and t1, the information in the master flip-flop storage element is transferred to the slave flip-flop storage element. In addition, an information signal from master flip-flop storage element 134(R3, C8)M is directed to hologram 125(R3, C8)M that redirects it to output fiber pair 160(1).

At time t1 after the transfer of information has been completed, timing control signal 158 transitions to a low power level. As a result, a complementary information signal pair representing information stored in the slave flip-flop storage elements is directed to the oppositely facing hologram which redirects the signal back to adjacent the master flip-flop storage element. This transfers the data from the slave flip-flop storage element to the master flip-flop storage element. At time t2, timing signal 157 returns to a low power level, and timing signal 158 returns to a high power level. The aforementioned sequence is then repeated to shift each bit of information through the shift register row and onto output fiber power 160(1). Consequently, the desired parallel to serial conversion is performed converting spatially-separated information into a temporally-separated format. As shown in FIG. 13, the time frame boundary occurs at time t8. In FIG. 14, the time frame boundary occurs at time frame t7, and in FIG. 15 the time boundary occurs at time t4. It should be apparent that the words of data shifted out after the frame boundary in FIG. 15 correspond to time frame (F-1), because these data words were being switched through the distributor while time frame F was being loaded into input shift register unit 129 as illustratively shown in FIG. 13.

A group of output shift register rows such as rows 129R1-129R3 each containing a time slot of information is associated with each output fiber pair such as 160(1). The group contains a time frame of information for serial transmission of temporally separated information on the associated output fiber pair. Control timing signals 156-159 are clocked at the data rata of the output fiber transmission system to emit the information signals from the end device in each of the enabled shift register rows. The rows in each group are enabled autonomously in a well-known manner or, alternatively, under control of the output fiber system 190 via control bus 174. Well-known timing and synchronization signals are sent via bus 167 from control circuit 110 to output fiber system 190 to synchronize the optical switch and output optical carrier facilities 190.

A layer of optically transparent spacer material 126 is placed between output shift register unit 129 and output fibers pairs 160(1)-160(N). Spacer 160(1)-160(N). Spacer material 126 provides space for each of the hologram pairs to direct an optical signal pair to the associated output fiber pair at an angle to minimize transmission losses.

In summary, optical switch 100 can perform both space-and time-division optical switching all in the optical domain entirely with one within stage of switching. This is accomplished by the use of distributor system 103 for spatially distributing the optical information signal pairs from encoder array 102 across all the rows of decoder array 104. Serially-received optical information is loaded into the row of the input shift register unit 131. In order for the parallelism of this system to be exploited, the data to be switched must presented to the switch in a parallel form, this is accomplished by input shift register unit shifting the serialy received data into a row associatted with a particular time slot of data. Similarly, the reverse operation is performed in output shift register unit 129 in which output information switched through distributor 103 is serially read out of the output shift register rows and serially transmitted on output fiber pairs 160(1)-160(N). This shifting in and out of optical information in the shift register units permits the distributor to operate at a much slower speed of that of the incoming and outgoing data. Only the input and output storage units need operate at the speed of the incoming and output serial bit stream. In put system 101 converts a temporally-separated bit stream of optical signals into a spatially-separated bit pattern. The information is then switched through the distributor in a parallel manner to output system 105 using respective encoder and decoder arrays 102 and 104 under the control of switch control circuit 110. Thus, the data in any time slot on an input fiber can be switched to any other time slot on any output fiber, thus performing time as well as space-division switching.

It is to be understood that the above-optical switch is merely an illustrative embodiment of the principles of this invention and that numerous other optical switches may be devised by those skilled in the art without departing from the scope of the invention. In particular, the input and output storage arrays may be replaced by two banks of input and output shift registers. One bank is loaded with information, while the other bank containing information of another time frame is either switched through the distributor or shifted out onto an output fiber.

What is claimed is:

1. An optical switch comprising:
   distributor means for spatially distributing an input electric field pattern emitted from any of a plurality of input positions, into an output electric field pattern having magnitude for illuminating all of a plurality of output positions such that the magnitude of said output electric field pattern is a Fourier transform of said input electric field pattern.

2. The optical switch of claim 1 wherein the input electric field pattern from any of said plurality of input positions represents information and wherein said optical switch further comprises decoder means responsive to the magnitude of said output electric field pattern for emitting from a selected output position of said plurality of output positions an optical signal representative of said information.

3. The optical switch of claim 2 further comprising control means for controlling said decoder means for emitting said optical signal from said selected output position.

4. The optical switch of claim 2 further comprising storage means having a plurality of storage elements and responsive to said optical singal from said decoder means for storing at a selected storage element of said storage elements information represented by said optical signal from said selected output position.

5. The optical switch of claim 1 further comprising encoder means for emitting said input electric field from a selected input position of said input positions.

6. The optical switch of claim 5 further comprising control means for controlling said encoder means for emitting said input electric field from said selected input position.

7. The optical switch of claim 6 further comprising storage means for storing information and responsive to an optical power signal for emitting to said encoder means an optical signal representative of said information.

8. The optical switch of claim 1 further comprising encoder means having a plurality of elements linearly aligned at said input positions for storing information and responsive to a second electric field pattern having a magnitude with a predetermined distribution across said linearly aligned elements for emitting said first-recited input electric field pattern having a magnitude approximating said predetermined distribution and representing the information stored in a selected one of said elements.

9. The optical switch of claim 8 further comprising means for emitting said second electric field pattern of which the magnitude thereof has a Gaussian distribution.

10. The optical switch of claim 1 wherein said distributor means comprises means having an optical axis for centering about said axis the optical signal propagating therethrough from any of said input positions.

11. The optical switch of claim 10 wherein said distributor means further comprises means for magnifying in a first predetermined direction the optical signal propagating from any of said input positions through said means for centering.

12. The optical switch of claim 11 wherein said distributor means further comprises means for imaging in a second predetermined direction substantially normal to said first predetermined direction an optical signal propagating from any of said input positions to said output positions.

13. An optical switch comprising:
a first plurality of optical elements aligned in rows and columns for emitting an optical signal from a column in a selected row of said optical elements; and
distributor means for mapping said optical signal from said column in said selected row of said first elements to all optical elements in a corresponding column of a second plurality of optical elements aligned in rows and columns, each column of said first optical elements having an individual corresponding column of said second optical elements.

14. An optical switch comprising:
a first array of optical elements aligned in rows and columns for emitting an optical signal from any optical element in a selected row of said first optical elements;
a second array of optical elements aligned in row and columns, each column of said first elements having an individual corresponding column of said second elements; and
distributor means for mapping each optical signal from a signal from a column in said selected row of said first elements to all of the optical elements in the individual corresponding column of said second element.

15. An optical switch comprising: distributor means for spatially distributing an input electric field pattern resulting from a contribution of an optical noise signal from each of a plurality of substantially periodically and linearly aligned input positions and from a contribution of an optical information signal from one of said input positions, into an output electric field pattern having magnitude for illuminating all of a plurality of periodically and linearly aligned output positions such that the magnitude of said output electric field pattern is a Fourier transform of said input electric field pattern.

16. The optical switch of claim 15 further comprising encoder means for controlling the contribution of the optical noise signal from each of said input positions to said input electric field pattern.

17. The optical switch of claim 16 further comprising decoder means responsive to the magnitude of said output electric field pattern for emitting an optical output signal from a selected output position of said output positions.

18. An optical switch comprising:
distributor means for spatially distributing an input electric field pattern resulting from an optical noise signal from each optical element of an input array having rows and columns of optical elements and a plurality of optical information signals from a selected row of said input array elements, into an output electric field pattern having magnitude for illuminating each optical element in an individual corresponding column of an output array having rows and columns of optical elements.

19. The optical switch of claim 18 further comprising decoder means including said output array elements and responsive to the magnitude of said output electric field pattern for emitting an optical output signal from each element in only a selected row of said output array elememts.

20. The optical switch of claim 19 further comprising storage means for storing information represented by said optical output signals.

21. The optical switch of claim 20 further comprising encoder means including said input array elements for emitting said optical information signals from a selected row of said input array elements.

22. An optical switch comprising:
encoder means having a plurality of optical elements aligned in rows and columns for emitting from each column in a selected row of said elements an optical signal representative of information stored in said selected row in a spatially-separated format;

decoder means having a plurality of optical elements aligned in rows and columns, each column of said optical elements of said encoder means having an individual corresponding column of said optical elements of said decoder means;

distributor means for spatially distributing the optical signal from each column in said selected row of said optical elements of said encoder means into a predetermined pattern for illuminating all the elements in each individual corresponding column of said decoder means; and said decoder means when illuminated for storing in a selected row of said optical elements thereof the information stored in said selected row of said encoder means.

23. The optical switch of claim 22 further comprising input means for converting information received in a temporally-separated format from a plurality of optical input signal carrier facilities into said spatially-separated format.

24. The optical switch of claim 23 wherein said input means comprises first input storage means having a plurality of storage elements aligned in rows and columns for each one of said optical signal carrier facilities for storing the information received in said temporally-separated format from a facility of said optical input signal carrier facilities in said rows of said storage elements for said facility in said spatially-separated format.

25. The optical switch of claim 24 wherein said input means further comprises second input storage means having a plurality of storage elements aligned in rows and columns for storing the information in said spatially-separated format stored in said first input storage means for emitting from a selected row of said storage elements thereof to said encoder means optical signals representative of the information in said spatially-separated format stored therein.

26. The optical switch of claim 23 further comprising output means for converting the information in said spatially-separated format from said decoder means into a temporally-separated format.

27. The optical switch of claim 26 wherein said output means comprises first output storage means having a plurality of storage elements aligned in rows and columns for storing therein the information in said spatially-separated format received from said decoder means and responsive to an optical power signal for emitting from each of said storage elements thereof an optical signal representative of the information stored therein.

28. The optical switch of claim 27 wherein said output means further comprises second output storage means having a plurality of storage elements aligned in rows and columns for storing therein the information received from said first output storage means for converting the information in said spatially-separated format therein to said temporally-separated format for transmission on a plurality of optical output signal carrier facilities.

29. An optical switch comprising:

a first plurality of optical elements linearly aligned, each for storing information, and responsive to an optical signal having a predetermined magnitude distribution across said linearly aligned elements for emitting a first electric field pattern representative of an information signal from a selected one of said elements and also representative of a noise signal from the remaining of said elements, distributor means for spatially distributing said first electric field pattern into a second electric field pattern having magnitude for illuminating all of a second plurality of optical elements linearly aligned such that the magnitude of said second electric field pattern is a Fourier transform of said first electric field pattern and that a ratio of said information signal to said noise signals is above a predetermined amount at said second linearly aligned elements.

30. The switch of claim 29 further comprising means for emitting said optical signal having said predetermined distribution.

* * * * *

UNITED STATES PATENT AND TRADEMARK OFFICE
CERTIFICATE OF CORRECTION

PATENT NO. : 4,830,444

DATED : May 16, 1989

INVENTOR(S) : Thomas J. Cloonan, Harvard S. Hinton, Frederick B. McCormick, Jr.

It is certified that error appears in the above-identified patent and that said Letters Patent is hereby corrected as shown below:

IN THE SPECIFICATION

Column 5, line 19, "represent" should be "represents";
Column 5, line 51, "havong" should be "having";

Column 9, line 68, "lower" should be "low";
Column 13, line 7, "g(y)=(x,y)" should be "y(y=g(x,y)";
Column 17, lines 27 and 28, "comb-(y/(P+G))" should be "comb(y/(P+G))";
Column 18, line 11, "A=1-1/29k" should be "$A=1-1/\sqrt{k}$,";
Column 19, lines 52-53, delete in their entirety;
Column 19, line 54, delete "102 extends to infinity in the vertical dimension.";
Column 23, line 31, "splitte" should be "splitter";
Column 23, line 40, "133R1-XRP" should be "133R1-133RP";
Column 23, line 42, "optic" should be "optical";
Column 23, line 43, after "storage" insert --elements--;
Column 23, line 58, "100" should be "110";

UNITED STATES PATENT AND TRADEMARK OFFICE
CERTIFICATE OF CORRECTION

PATENT NO. : 4,830,444
DATED : May 16, 1989
INVENTOR(S) : Thomas J. Cloona, Harvard S. Hinton, Frederick B. McCormick, Jr.

It is certified that error appears in the above-identified patent and that said Letters Patent is hereby corrected as shown below:

IN THE SPECIFICATION

Column 24, line 59, "131C1-134C8" should be "134C1-134C8";
Column 26, line 13, delete "Spacer 160(1)-160(N).";
Column 26, line 25, "row" should be "rows".
Column 26, line 30, "associatted" should be "associated";

Column 27, line 17, "singal" should be "signal";
Column 28, line 16, delete "from a signal";
Column 28, line 57, "elememts" should be "elements".

Signed and Sealed this

Twenty-ninth Day of January, 1991

Attest:

HARRY F. MANBECK, JR.

*Attesting Officer*    *Commissioner of Patents and Trademarks*